US012795619B2

(12) United States Patent
Venkateswaran et al.

(10) Patent No.: US 12,795,619 B2
(45) Date of Patent: Nov. 10, 2026

(54) HIERARCHICAL WIRELESS BATTERY MANAGEMENT SYSTEM

(71) Applicant: TEXAS INSTRUMENTS INCORPORATED, Dallas, TX (US)

(72) Inventors: Shyam Krishnan Venkateswaran, Atlanta, GA (US); Ariton E. Xhafa, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 600 days.

(21) Appl. No.: 18/345,636

(22) Filed: Jun. 30, 2023

(65) Prior Publication Data

US 2025/0008491 A1 Jan. 2, 2025

(51) Int. Cl.
*H04W 72/0446* (2023.01)
*H02J 7/40* (2026.01)

(52) U.S. Cl.
CPC ........... *H04W 72/0446* (2013.01); *H02J 7/40* (2026.01)

(58) Field of Classification Search
CPC ... H04W 72/0446; H04W 84/10; H04W 4/38; H02J 7/00032; H04L 67/125; H04L 69/28
See application file for complete search history.

(56) References Cited

U.S. PATENT DOCUMENTS 11,872,905 B2 * 1/2024 Xhafa ..................... B60L 58/10
12,155,462 B2 * 11/2024 Muhanna .............. H04J 3/0658
12,187,301 B2 * 1/2025 Himayat ............... B60W 50/06
12,257,921 B2 * 3/2025 Xhafa ..................... B60L 58/10
2021/0084675 A1 3/2021 Aijaz et al.
2021/0188306 A1 * 6/2021 Himayat ............... B60W 50/06
2021/0377894 A1 * 12/2021 Kamath .................... H04L 7/04
2022/0074998 A1 * 3/2022 Aquilano ............. G01R 31/392
2022/0137139 A1 * 5/2022 Urban .................. G01R 31/396 702/63
2022/0332213 A1 10/2022 Xhafa et al.
2022/0360979 A1 * 11/2022 Santhana Krishnan .................... H04W 12/041

(Continued)

FOREIGN PATENT DOCUMENTS

WO 2012061262 A1 5/2012

OTHER PUBLICATIONS

International Search Report mailed on Oct. 16, 2024, PCT Application No. PCT/US2024/034989 filed Jun. 21, 2024, 3 pages.

(Continued)

*Primary Examiner* — Jay P Patel
(74) *Attorney, Agent, or Firm* — Carl G. Peterson; Charles F. Koch

(57) ABSTRACT

In an example, a method includes receiving, in a super frame, a first downlink on a first channel from a wireless master node at a wireless head node in a WBMS, where the wireless head node is a head node for a sub-cluster of one or more wireless devices. The method includes transmitting, in the super frame, a second downlink on a second channel from the wireless head node to each of the one or more wireless devices. The method includes receiving, in the super frame, an uplink from each of the one or more wireless devices at the wireless head node on the second channel. The method includes transmitting, in the super frame, an aggregated uplink from the wireless head node to the wireless master node on the first channel, where the aggregated uplink includes data from each of the one or more wireless devices.

20 Claims, 21 Drawing Sheets

(56) References Cited

U.S. PATENT DOCUMENTS

| | | | | |
|---|---|---|---|---|
| 2023/0051689 | A1 | 2/2023 | Santhana Krishnan et al. | |
| 2024/0072920 | A1* | 2/2024 | Muhanna | B60L 58/16 |
| 2025/0222820 | A1* | 7/2025 | Xhafa | B60L 53/66 |
| 2025/0358750 | A1* | 11/2025 | Beaulaton | H01M 10/482 |

OTHER PUBLICATIONS

Written Opinion mailed on Oct. 16, 2024, PCT Application No. PCT/US2024/034989 filed Jun. 21, 2024, 11 pages.

* cited by examiner

HIERARCHICAL WIRELESS BATTERY MANAGEMENT SYSTEM

BACKGROUND

Modern vehicles may include multiple battery cells. Information associated with the cells, such as temperature, voltage, and other indicators of cell status and health, may be monitored for vehicular safety and to ensure proper operation. In a conventional wired battery management system, rechargeable batteries are managed by circuitry for the safe and efficient operation of the batteries. Wired communication interfaces can be used to connect a main microcontroller (the main node or master node) to each battery module (the secondary nodes), and each battery module is chained to the rest of the battery modules in a daisy chain. With wired communication interfaces, the main microcontroller cannot monitor and control all the battery modules in parallel without complex wiring. This wiring makes repair or replacement of individual battery cells more difficult, and importantly, adds weight and bulk to the overall system.

A wireless connection between the battery modules and the microcontroller makes management of battery modules more flexible and easier to repair. In a wireless battery management system (WBMS), a microcontroller monitors each battery module and communicates with the battery modules using wireless communication interfaces. The main microcontroller controls all the battery modules using a WBMS protocol. Wireless communication interfaces can suffer from wireless communication channel bandwidth variance, interference, and/or other issues, which would prevent proper monitoring and management in a WBMS.

SUMMARY

In accordance with at least one example of the description, a method includes receiving, in a super frame, a first downlink on a first channel from a wireless master node at a wireless head node in a WBMS, where the wireless head node is a head node for a sub-cluster of one or more wireless devices. The method also includes transmitting, in the super frame, a second downlink on a second channel from the wireless head node to each of the one or more wireless devices in the sub-cluster. The method includes receiving, in the super frame, an uplink from each of the one or more wireless devices at the wireless head node on the second channel. The method also includes transmitting, in the super frame, an aggregated uplink from the wireless head node to the wireless master node on the first channel, where the aggregated uplink includes data from each of the one or more wireless devices in the sub-cluster.

In accordance with at least one example of the description, a system includes a wireless head node in a WBMS, where the wireless head node is a head node for a sub-cluster of one or more wireless devices. The wireless head node is configured to receive, in a super frame, a first downlink on a first channel from a wireless master node. The wireless head node is also configured to transmit, in the super frame, a second downlink on a second channel to each of the one or more wireless devices in the sub-cluster. The wireless head node is configured to receive, in the super frame, an uplink from each of the one or more wireless devices on the second channel. The wireless head node is also configured to transmit, in the super frame, an aggregated uplink to the wireless master node on the first channel, where the aggregated uplink includes data from each of the one or more wireless devices in the sub-cluster.

In accordance with at least one example of the description, a system includes a first wireless head node in a WBMS, where the first wireless head node is a head node for a sub-cluster of one or more wireless devices. The first wireless head node is configured to receive, in a super frame, a first downlink on a first channel from a wireless master node. The first wireless head node is also configured to transmit, in the super frame, a second downlink on a configuration channel to each of the one or more wireless devices in the sub-cluster. The first wireless head node is configured to wait for a second wireless head node to transmit a third downlink on the configuration channel. The first wireless head node is also configured to receive, in the super frame, an uplink from each of the one or more wireless devices on a second channel. The first wireless head node is configured to transmit, in the super frame, an aggregated uplink to the wireless master node on the first channel, where the aggregated uplink includes data from each of the one or more wireless devices in the sub-cluster.

BRIEF DESCRIPTION OF THE DRAWINGS

The same reference numbers or other reference designators are used in the drawings to designate the same or similar (functionally and/or structurally) features.

DETAILED DESCRIPTION

Figure 1:
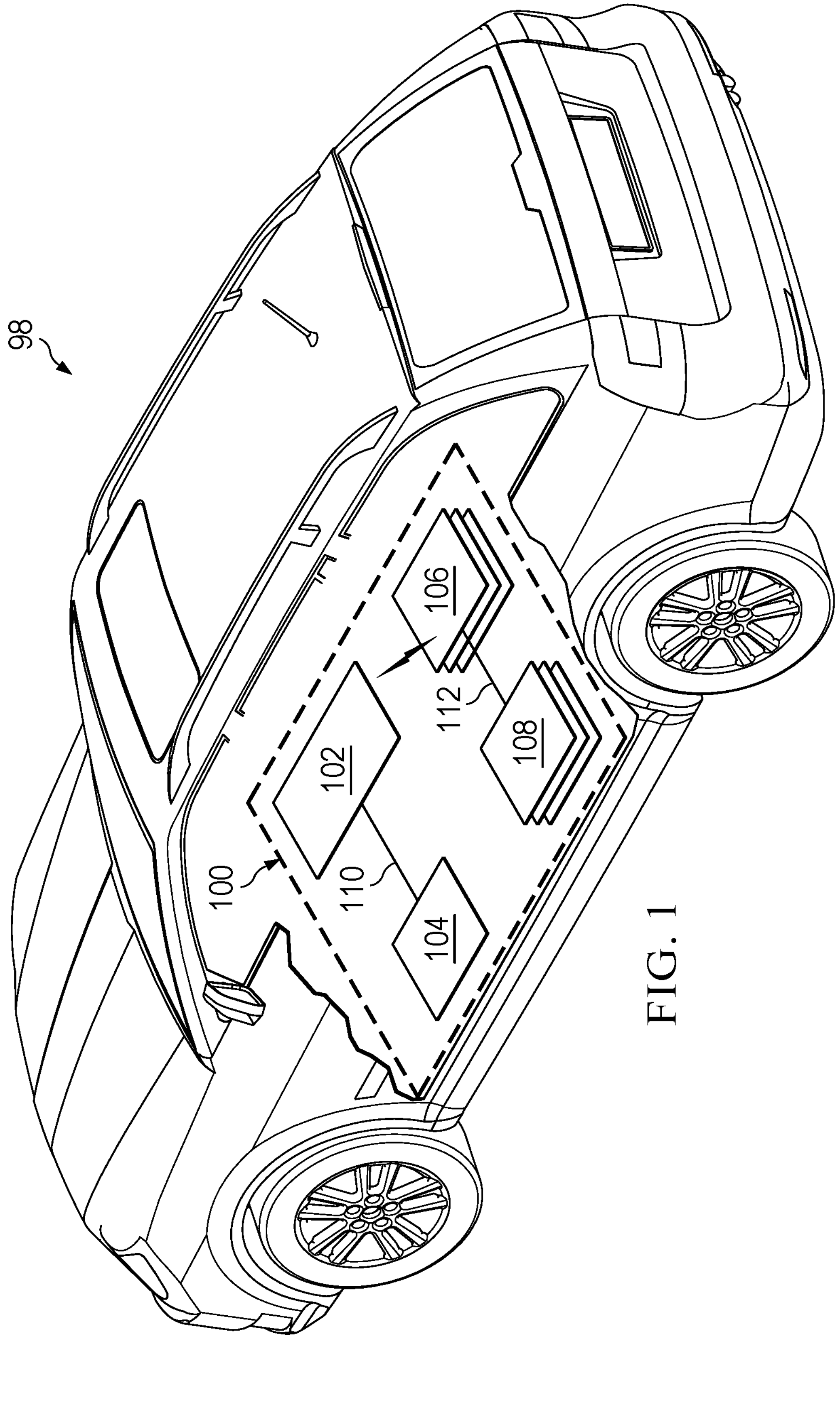
FIG. 1 is a perspective view of an example system, such as an automotive vehicle, that includes a wireless battery management system (WBMS) in accordance with various examples.

Some electronic devices operate using batteries. For example, electric vehicles include multiple battery cells that provide power to those vehicles. Because battery cells in an electronic device can provide large amounts of power, and further because the power provided by the battery cells may be vital to the operation of the electronic device, the electronic device may include a system to manage the battery cells.

Battery management systems (BMSs) may manage the battery cells of an electronic device in various ways. For example, a BMS may monitor the health (e.g., voltage, current, temperature) of battery cells in an electronic device. Further, the BMS may control various battery cells to manage the quantity of power provided by the battery cells and where that power is directed within the electronic device. Generally, a BMS includes multiple components, such as multiple battery modules and a controller to manage the battery modules. Each battery module, in turn, may couple to multiple battery cells and include a battery monitor to monitor those battery cells. Thus, the battery cells coupled to a battery module provide power to the electronic device; the battery monitor in the battery module monitors the health and operation of the battery cells in that battery module; and the controller communicates with the battery monitor to ensure the battery module and its cells are operating properly. The controller may also communicate with the battery monitor to control the operation of the battery cells, such as to turn on, turn off, redirect, or otherwise balance the power provided by those battery cells.

BMSs may incorporate wireless technology to create a wireless battery management system (WBMS). For example, a primary network node contains or is coupled to a controller and a secondary network node contains a battery module that controls multiple battery cells. The primary and secondary network nodes (e.g., the main/master node and the end nodes) may communicate with each other wirelessly, for example using radio frequencies. In some protocols, a super frame (SF) is useful to facilitate wireless communications between the primary and secondary network nodes. In the SF, the primary network node first broadcasts a downlink communication (or packet) to multiple secondary network nodes. The secondary network nodes individually respond to the primary network node with uplink communications (or packets) in a serial manner. Additional example details of WBMSs can be found in commonly assigned U.S. patent application Ser. No. 17/828,895, entitled "Efficient Unicast Super Frame Communications," filed on May 31, 2022, which is incorporated by reference in its entirety.

In a WBMS, as the number of nodes increases, latency issues may occur. A primary network node that communicates directly with a large number of secondary network nodes receives individual responses from each secondary network node serially, and these response may take a large amount of time to transmit to the primary network node. The SF duration increases in size with the increase in the number of nodes. Also, in large networks, some secondary nodes may not be within communication range of the primary node.

In examples herein, a hierarchical WBMS network structure is described that can handle a large number of nodes with low latency and one-hop extension. A primary node (also referred to herein as a wireless master (WM)) operates as a master node for an entire network of nodes. The secondary nodes are divided into sub-clusters, with one or more secondary nodes in each sub-cluster. A secondary node in each sub-cluster operates as a wireless head (WH) node, and acts as a master node for the sub-cluster to which it belongs. The other secondary nodes in each sub-cluster are referred to as wireless devices (WD) herein. In some examples, a dedicated WH node may be used in the sub-cluster rather than selecting one of the WDs as the WH. The WM and the WHs use a master hopping sequence (MHS) to manage the communications channels used by the nodes.

In the hierarchical system described herein, the WM communicates with the WHs, and the WHs communicate with the WDs. The WM and the WDs do not generally communicate directly with one another, at least in some examples. The WM is in communication range with the WHs, and the WHs are in communication range with their respective WDs in their sub-cluster. The sub-clusters may have the same number of WDs, or the sub-clusters may have different numbers of WDs. A number of SF structures are described herein for managing communications between nodes arranged in the hierarchical system.

For a WBMS with a large number of nodes, the latency is reduced with the hierarchical system and SF structures described herein. Throughput is also increased due to the efficient SF structures. Low network restart times may be achieved, and power consumption may also be reduced in the examples herein. Moreover, it may be easier to re-establish communication with a WD using the techniques of this disclosure.

FIG. 1 is a perspective view of an example system 98, such as an automotive vehicle, that includes a WBMS 100, in accordance with various examples herein. In some examples, the system 98 is any system that may include a WMBS to supply power to one or more components of the system 98. As shown, WBMS 100 includes a primary network node 102, a battery controller 104, a plurality of secondary network nodes 106, and a plurality of battery cells 108. The primary network node 102 may be a WM, and the secondary network nodes 106 may be WHs and WDs, with the WDs arranged in sub-clusters and each sub-cluster having a WH to manage its respective WDs. FIG. 1 depicts the WHs and WDs as a single stack of secondary network nodes 106, but other drawings in this application (e.g., FIG. 3) depict a network architecture that distinguishes between the WHs and WDs. Although this disclosure describes communication techniques primarily in the context of wireless systems, these techniques may also be useful for wired systems (e.g., where the connection between nodes 102 and 106 is wired).

In an example, the primary network node 102 is coupled to the battery controller 104 using a first wired connection 110. In an example, the first wired connection 110 between the primary network node 102 and the battery controller 104 is a universal asynchronous receiver/transmitter (UART), inter-integrated circuit (I2C), or the like. The WHs in secondary network nodes 106 are wirelessly coupled to the primary network node 102 (e.g., the WM). The WHs and WDs in the secondary network nodes are coupled to the battery cells 108 using a second wired connection 112. Although FIG. 1 shows a single primary network node 102 and a single battery controller 104, other example network architectures having multiple primary/main nodes can be used to implement the techniques of this disclosure. Additional example details of multiple main nodes in a WBMS can be found in commonly assigned U.S. patent application Ser. No. 17/823,138, entitled "Multiple Primary Nodes for Wireless Battery Management System Robustness," filed on Aug. 30, 2022, which is incorporated by reference in its entirety.

In an example, WBMS 100 provides wireless radio frequency (RF) communication between the primary network node 102 and the WHs of the secondary network nodes 106, and between the WHs and the WDs. In an example, the wireless RF communication uses the license-free 2.4 gigahertz (GHz) industrial, scientific, and medical (ISM) band from 2.4 GHz to 2.483 GHZ, which is compliant with BLUETOOTH special interest group (SIG). In examples, WBMS 100 uses 2 megabits per second (Mbps) BLUETOOTH low energy (BLE) across the physical layer (PHY). The Open Systems Interconnection (OSI) model includes the PHY as a layer used for communicating raw bits over a physical medium. In this case, the PHY is free space, which WBMS 100 uses to wirelessly communicate between the primary network node 102 and the WHs of the secondary network nodes 106. In an example, the transmission power of WBMS 100 is less than or equal to 10 decibel-milliwatts (dBm).

In an example, the wireless RF communication between the primary network node 102 and the WHs of the secondary network nodes 106 utilizes frequency hopping and time slotted allocations to transmit and receive data across SFs, as does the RF communication between the WHs and the respective WDs. An SF, also referred to as a super frame interval, is a time interval including time and frequency allocations for data exchanges between the primary network node 102 and the WHs of the secondary network nodes 106 (and between the WHs and the WDs), including interframe spacing between these allocations. Frequency hopping includes transmitting RF signals by rapidly changing the transmission frequency among many distinct frequencies occupying a spectral band. In an example, frequency hopping occurs based on a linear shift-back register and a master identification (ID) of the primary network node 102. The linear shift-back register uses linear bit rotation to indicate a pattern of frequencies on which the primary network node 102 and the secondary network nodes 106 will communicate. Time slotted allocations are time slots that are assigned either to the primary network node 102 or one or more of the secondary network nodes 106 for transmitting to either one or more of the secondary network nodes 106 or the primary network node 102. The time slotted allocations occur in a half-duplex mode, as both the primary network node 102 and the secondary network nodes 106 switch between transmit and receive modes according to the temporal moment specified in scan/pairing frames of exchanged data for downlink (DL)/uplink (UL) durations.

In an example, the WBMS 100 uses frequency division multiple access (FDMA) and changes the frequency at which frames are transmitted between the primary network node 102 and the respective secondary network nodes 106 (and between the WHs and the WDs) to increase robustness against interference. In an example, the WBMS 100 uses frequency hopping tables, black listing of frequencies, and configuration channels to mitigate interference with other wireless networks. Frequency hopping occurs on a per SF basis, where during the SF, time slotted allocations are used for frame exchange. Black listing is suspending the use of frequency channels that may be susceptible to interference. Configuration channels may be used for scanning, pairing, and negotiating communication between the primary network node 102 and the WHs of the secondary network nodes 106, and between the WHs and the WDs.

In an example, the wireless RF communication between the primary network node 102 and the secondary network nodes 106 uses 40 channels, where a subset of the 40 channels (e.g., channels 37, 38, and 39) is used for system configuration and the remaining 37 channels are used to exchange data. The WHs may also communicate with the WDs using configuration channels and data channels. In an example, a single channel may be used as a configuration channel.

In an example, WBMS 100 supports periodic and a-periodic data exchanges from the secondary network nodes 106 to the primary network node 102 using wireless RF communication, and between the WHs and the WDs. The primary network node 102 and the secondary network nodes 106 use a common data format structure for both periodic and a-periodic data exchanges. Periodic data exchange occurs based on a repetitive interval, while a-periodic data exchange does not occur based on a repetitive interval. The data format is a description of rules that the data populating a file will follow. Generally, the more thorough the description of the data format, the easier it is for validation rules to be written on both the sending and receiving sides of the wireless battery management system 100.

In an example, the primary network node 102 scans the network to obtain a master ID and discover the secondary network nodes 106 or the WHs of the secondary network nodes 106. The primary network node 102 scans the network by transmitting a management frame to coordinate medium access, wakeup schedules, and clock synchronization within the secondary network nodes 106. The primary network node 102 also uses the management frame to learn about the secondary network nodes 106 in the network. Initially, the primary network node 102 performs a passive scan to obtain (or check for) a master ID value in use by other nodes and/or devices. The primary network node 102 then selects a master ID that is different from the master IDs used by other nodes and/or devices.

In an example, after the primary network node 102 has selected a master ID, the primary network node 102 transmits a scan request frame in every SF period as long as there are unconnected secondary network nodes 106 from the primary network node 102. In an example, the primary network node 102 is programmed with the total number of the secondary network nodes 106 to be connected to the primary network node 102. After all the secondary network nodes 106 are connected and confirmed, the primary network node 102 will not transmit any more scan requests. The scan request frames include information about the structure of the SF and the frame formatting of the DL and UL slots.

For the primary network node 102 to scan for the secondary network nodes 106, the primary network node 102 enters a scan state. In this state, the primary network node 102 transmits a scan request frame in every SF period. The secondary network nodes 106 reply to the primary network node 102 with a scan response and await a pairing request frame from the primary network node 102. After the secondary network nodes 106 receive the pairing request, the secondary network nodes 106 respond within the same SF in the frequency slot assigned by the primary network node 102. In examples, this exchange occurs in the configuration channels. No data exchanges occur in this state. Additional example details of establishing a communication channel can be found in commonly assigned U.S. Patent Application Publication No. 2022/0332213, entitled "Wireless Protocol for Battery Management," filed on Apr. 16, 2021; and U.S. Patent Application Publication No. 2023/0051689, entitled "Wireless Battery Management System Setup," filed on Aug. 11, 2021, each of which is incorporated by reference in its entirety.

In an example, transmission cycles or SFs depend on the number of secondary network nodes 106 and/or battery cells 108 in the network. The primary network node 102 determines the SF interval based on the number of secondary network nodes 106 or the number and size of the sub-clusters as described herein. Given a number of secondary network nodes 106 and/or sub-clusters, the primary network node 102 estimates the number of DL slots usable to transmit the packets to the secondary network nodes 106.

WBMS 100 manages the battery cells 108 using the primary network node 102, the battery controller 104, and the secondary network nodes 106. The primary network node 102 and the secondary network nodes 106 (e.g., the WHs) communicate with each other about the state of the battery cells 108. The primary network node 102 and the secondary network nodes 106 may communicate with or among each other using various protocol formats. For example, the primary network node 102 and the secondary network nodes 106 use a DL protocol format and a UL protocol format, where each of the DL protocol format and the UL protocol format includes a frame control field to communicate battery management information. When the battery cells 108 notify the secondary network nodes 106 of a condition, the secondary network nodes 106 communicate to the primary network node 102 (or to the respective WH of the sub-cluster) that the condition is present. The primary network node 102 receives the notification of the condition from the secondary network nodes 106 (e.g., the WHs) and alerts the battery controller 104 of the condition. The battery controller 104 determines a proper reaction to the condition and sends an instruction to the primary network node 102. The primary network node 102 transmits the instruction to the secondary network nodes 106 (e.g., the WHs). The WHs transmit the instructions to the WDs in the sub-clusters. The secondary network nodes 106 receive the instruction to manage the battery cells 108 in response to the condition. The secondary network nodes 106 manage the battery cells 108 in response to the condition.

Figure 2A:
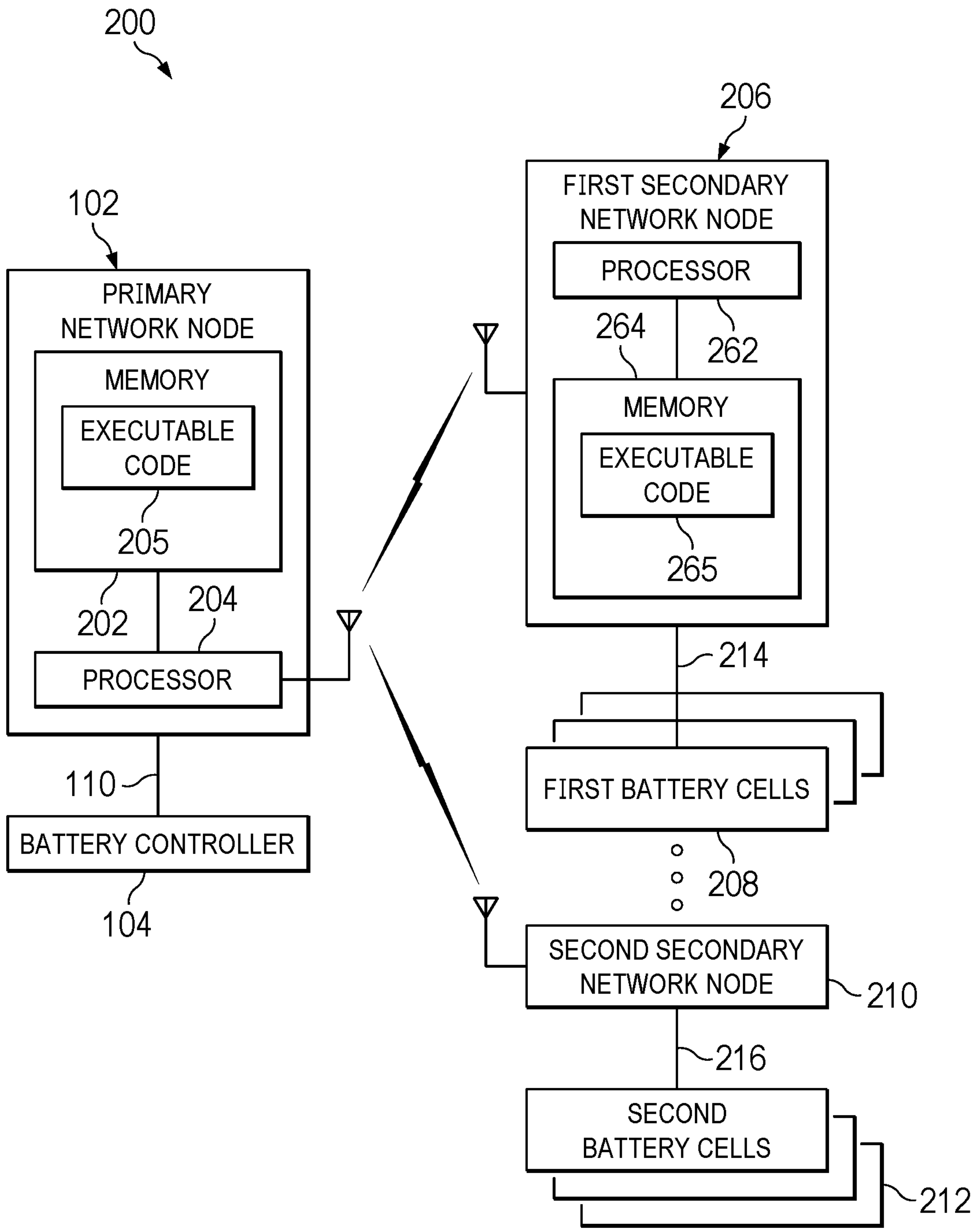
FIG. 2A is an example WBMS in accordance with various examples.
Figure 2B:
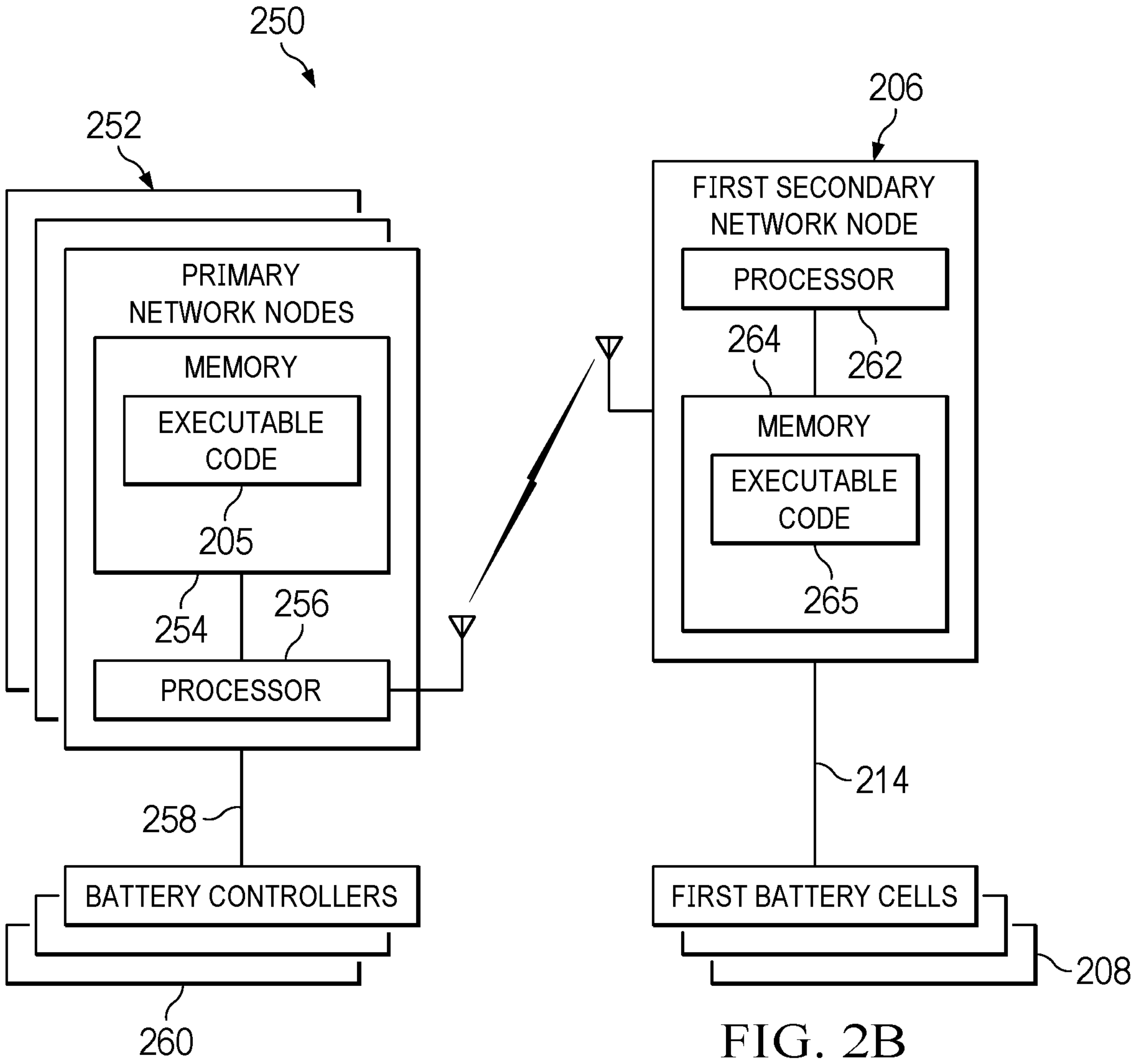
FIG. 2B is an example WBMS in accordance with various examples.

FIG. 2A illustrates an example WBMS 200. WBMS 200 is an example of the wireless battery management system 100 described above. As shown, WBMS 200 includes the primary network node 102, the battery controller 104, a memory 202, a processor 204, a first secondary network node 206, a first plurality of battery cells 208, a second secondary network node 210, and a second plurality of battery cells 212. Additional secondary network nodes 206, 210 may be included, although they are not expressly shown. In one example, the primary network node 102 is the WM, and the secondary network nodes 206 and 210 are WHs. In another example, the primary network node 102 is a WH, and the secondary network nodes 206 and 210 are WDs. In respect, FIGS. 2A and 2B provide an illustration of the communication that occurs throughout the multi-level network architectures described herein. The primary network node 102 includes the memory 202 and the processor 204 that is configured to execute code 205 stored on the memory 202 to perform one or more of the actions attributed herein to the primary network node 102. In an example, a portion of the memory 202 may be non-transitory and a portion of the memory 202 may be transitory. The secondary network nodes 206, 210 also may include processors and memory. For example, as shown, the secondary network node 206 includes a processor 262 coupled to a memory 264 storing code 265 that is executable by the processor 262 to perform one or more of the actions attributed herein to the secondary network node 206.

The primary network node 102 (if it is a WM) is coupled to the battery controller 104 using the first wired connection 110 and is wirelessly coupled to each of the secondary network nodes 206, 210. The first secondary network node 206 is coupled to the first plurality of battery cells 208 using a third wired connection 214 and wirelessly coupled to the primary network node 102. The second secondary network node 210 is coupled to the second plurality of battery cells 212 using a fourth wired connection 216 and wirelessly coupled to the primary network node 102. FIG. 2A does not limit the number of secondary network nodes in the wireless battery management system 200; rather, the naming convention indicates that each of the secondary network nodes is coupled to a plurality of battery cells.

In an example, the primary network node 102 is wirelessly coupled to at least eight secondary network nodes 206, 210. In an example, each of the secondary network nodes 206, 210 can be coupled to at least sixteen battery cells using a wired connection. In examples, the wireless battery management system 200 includes one primary network node. In other examples, the wireless battery management system 200 includes multiple primary network nodes, with each network having its own hierarchical structure.

WBMS 200 manages the first plurality of battery cells 208 and the second plurality of battery cells 212 using the primary network node 102, the battery controller 104, the memory 202, the processor 204, the first secondary network node 206, and the second secondary network node 210. Instructions in the memory 202 cause the processor 204 to instruct the primary network node 102 to wirelessly communicate with the first secondary network node 206 and the second secondary network node 210 about the state of the first plurality of battery cells 208 and the second plurality of battery cells 212. The primary network node 102 and the secondary network nodes 206, 210 communicate using various protocol formats. For example, the primary network node 102 and the secondary network nodes 206, 210 use a DL protocol format and a UL protocol format, where each of the DL protocol format and the UL protocol format includes a frame control field to communicate battery management information. When the first plurality of battery cells 208 notify the first secondary network node 206 of a condition, the first secondary network node 206 communicates with the primary network node 102 (or with a WH) that the condition is present. The primary network node 102 (or the WH) receives the notification of the condition from the first secondary network node 206 and alerts the battery controller 104 (or the WM) of the condition. The battery controller 104 determines a proper reaction to the condition and sends an instruction to the primary network node 102. The primary network node 102 transmits the instruction to the first secondary network node 206 (or to the WHs). The first secondary network node 206 receives the instruction to manage the first plurality of battery cells 208 in response to the condition of the first plurality of battery cells 208. The first secondary network node 206 manages the first plurality of battery cells 208 in response to the condition. A similar process may apply to the second secondary network node 210 when a condition is present in the second plurality of battery cells 212. As described herein, with the hierarchical structure, the WM communicates with the WHs, and the WHs communicate with the respective WDs and then relay the responses from the WDs back to the WM.

FIG. 2B illustrates an example WBMS 250. WBMS 250 is an example of WBMS 100 described above. As shown, WBMS 250 includes the first secondary network node 206 (which may be a WD), the first plurality of battery cells 208, a plurality of primary network nodes 252 (which may be WHs), a memory 254, a processor 256, a first wired connection 258, and a plurality of battery controllers 260. The plurality of primary network nodes 252 includes the memory 254 and the processor 256. In an example, a portion of the memory 254 may be non-transitory and a portion of the memory 254 may be transitory. In examples, the memory 254 includes executable code 255 which, when executed by the processor 256, causes the processor 256 to perform the actions attributed herein to the primary network node 252.

The plurality of primary network nodes 252 are coupled to the plurality of battery controllers 260 using the first wired connection 258 and are wirelessly coupled to the secondary network node 206. The first secondary network node 206 is coupled to the first plurality of battery cells 208 using the wired connection 214 and wirelessly coupled to the plurality of primary network nodes 252. As shown in FIG. 2A, the first secondary network node 206 may include a processor and memory (e.g., processor 262 and memory 264). FIG. 2B does not limit the number of secondary network nodes in the wireless battery management system 250. In an example, each of the plurality of primary network nodes 252 is wirelessly coupled to at least eight secondary network nodes. In an example, the first secondary network node 206 can be coupled to at least sixteen battery cells using the fourth wired connection 216.

WBMS 250 manages the first plurality of battery cells 208 using the plurality of primary network nodes 252, the plurality of battery controllers 260, the memory 254, the processor 256, and the first secondary network node 206. Instructions in the memory 254 cause the processor 256 to instruct the plurality of primary network nodes 252 to wirelessly communicate with the first secondary network node 206 about the state of the first plurality of battery cells 208. The plurality of primary network nodes 252 and the first secondary network node 206 communicate using various protocol formats. For example, the plurality of primary network nodes 252 and the first secondary network node 206 use a DL protocol format and a UL protocol format, where each of the DL protocol format and the UL protocol format includes a frame control field to communicate battery management information. When the first plurality of battery cells 208 notify the first secondary network node 206 of a condition, the first secondary network node 206 communicates with the plurality of primary network nodes 252 that the condition is present. The plurality of primary network nodes 252 receives the notification of the condition from the first secondary network node 206 and alerts the plurality of battery controllers 260 of the condition. The plurality of battery controllers 260 determines a proper reaction to the condition and sends an instruction to the plurality of primary network nodes 252. The plurality of primary network nodes 252 transmits the instruction to the first secondary network node 206. The first secondary network node 206 receives the instruction to manage the first plurality of battery cells 208 in response to the condition of the first plurality of battery cells 208. The first secondary network node 206 manages the first plurality of battery cells 208 in response to the condition.

In an example, the first secondary network node 206 communicates with a first primary network node of the plurality of primary network nodes 252 based on instructions from a master controller (not shown). The first secondary network node 206 can transition communication from the first primary network node to a second primary network node of the plurality of primary network nodes 252. The first primary network node and the second primary network node communicate with each other to coordinate transferring the active connections of the first secondary network node 206 from the first primary network node to the second primary network node. In an example, the first primary network node communicates with the first secondary network node 206 and the second primary network node monitors a status of the first primary network node. The status can indicate whether the first primary network node has power and is operating within normal operating conditions. The first primary network node provides a clock signal to the second primary network node to synchronize communication. The first primary network node and the second primary network node select different frequencies to communicate with the first secondary network node 206. Selecting different frequencies allows the plurality of primary network nodes 252 to minimize interference when communicating to the first secondary network node 206. For example, if the first primary network node were to lose power, or if the status of the first primary network node were to fall out of normal operating conditions, then the second primary network node can connect to the first secondary network node 206 to supplement communication until the first primary network node can operate normally again.

Figure 3:
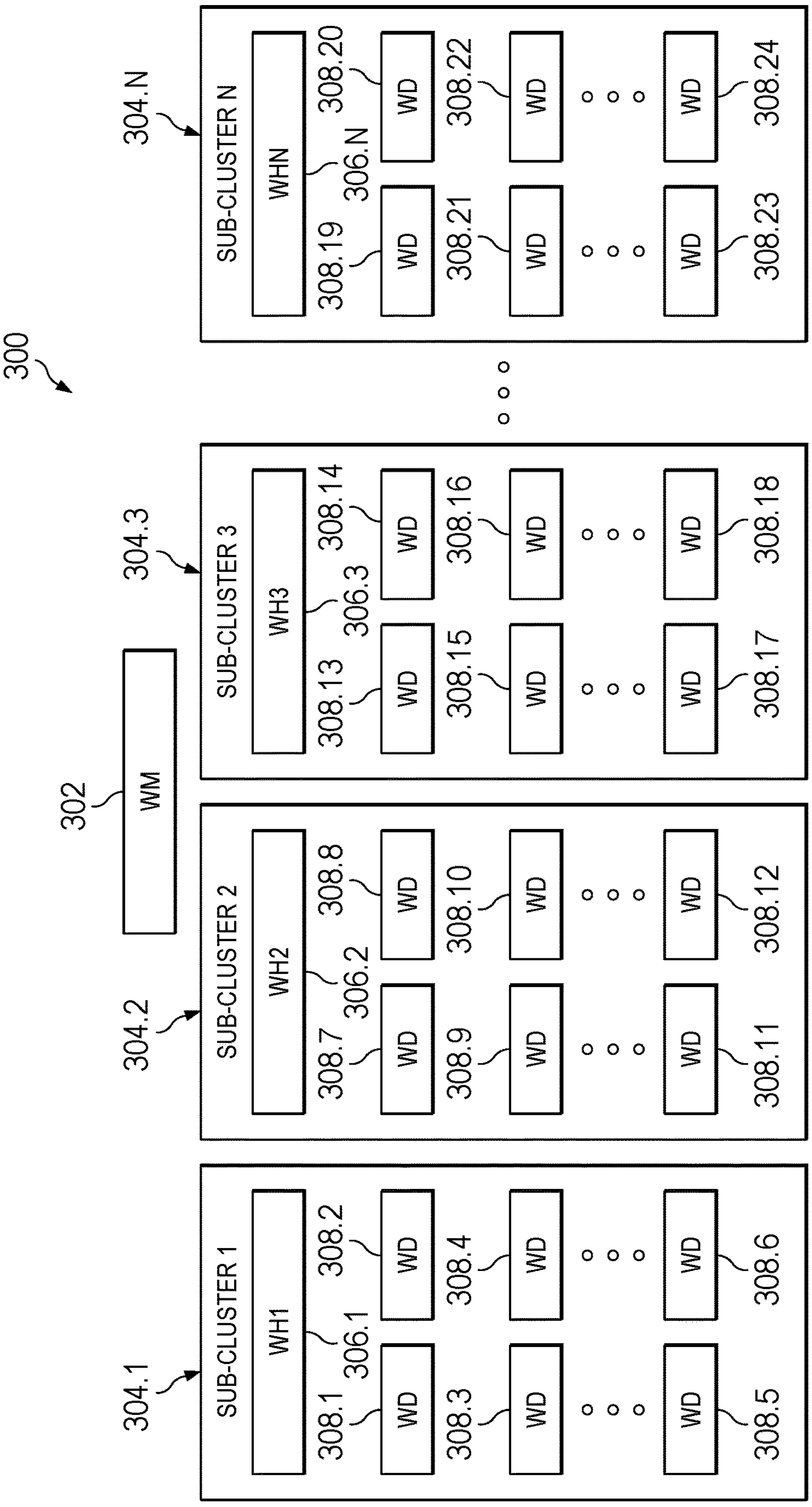
FIG. 3 is a block diagram of a hierarchical WBMS in accordance with various examples.

FIG. 3 is a block diagram of a hierarchical WBMS 300 in accordance with various examples herein. WBMS 300 includes a WM (wireless master) 302, sub-clusters 304, wireless heads (WH) 306, and wireless devices (WD) 308. In this example, one WM 302 manages the sub-clusters 304, but other network architectures with two or more WMs can be used to implement the techniques of this disclosure. Sub-clusters 304 may be referred to collectively as sub-clusters 304 or individually as a sub-cluster 304. Four sub-clusters 304 are shown in WBMS 300 (304.1, 304.2, 304.3, and 304.N), but any number of sub-clusters 304 may be present in other examples.

Each sub-cluster 304 has a WH 306 that manages the sub-cluster 304. Four WHs 306 are shown in FIG. 3 (WH1, WH2, WH3, and WHN). The WHs 306 may be referred to collectively as WHs 306 or individually as a WH 306. Each WH 306 communicates with the WM 302 and with the WDs 308 in its respective sub-cluster 304. Each sub-cluster 304 has one or more WDs 308 that communicate with the WH 306 in the sub-cluster 304. The WDs 308 may be referred to collectively as WDs 308 or individually as a WD 308.

In this example, WH1 306.1 manages WDs 308.1 to 308.6 in sub-cluster 304.1. Six WDs 308 are shown in sub-cluster 304.1 (e.g., WDs 308.1 to 308.6), but any number of WDs 308 may be present in the sub-clusters 304 in other examples. Sub-cluster 304.2 includes WH2 306.2 and WDs 308.7 to 308.12. Sub-cluster 304.3 includes WH3 306.3 and WDs 308.13 to 308.18. Sub-cluster 304.N includes WHN 306.N (where N may be any number) and WDs 308.19 to 308.24. In some examples, a WH 306 may also operate as a WD 308 and perform the monitoring and managing of a battery cell 108 that the WD 308 performs, in addition to the WH communication functionality that is described herein. However, this monitoring functionality is not contemplated for WHs 306 in all examples of this disclosure.

In examples herein, when installed in a WBMS, WM 302 is in communication range with the WHs 306, and each WH 306 is in communication range with its respective WDs 308 in its sub-cluster 304. The sub-clusters 304 may have the same number of WDs 308 or a different number of WDs 308.

Six WDs 308 are shown in each sub-cluster 304 in this example, but other numbers may be present in other examples. As described below, the WM 302, WHs 306, and WDs 308 may use a master hopping sequence for selecting channels for communication. Also, as described below, various super frame structures are described below to handle communications within a hierarchical WBMS as described herein.

Figure 4A:
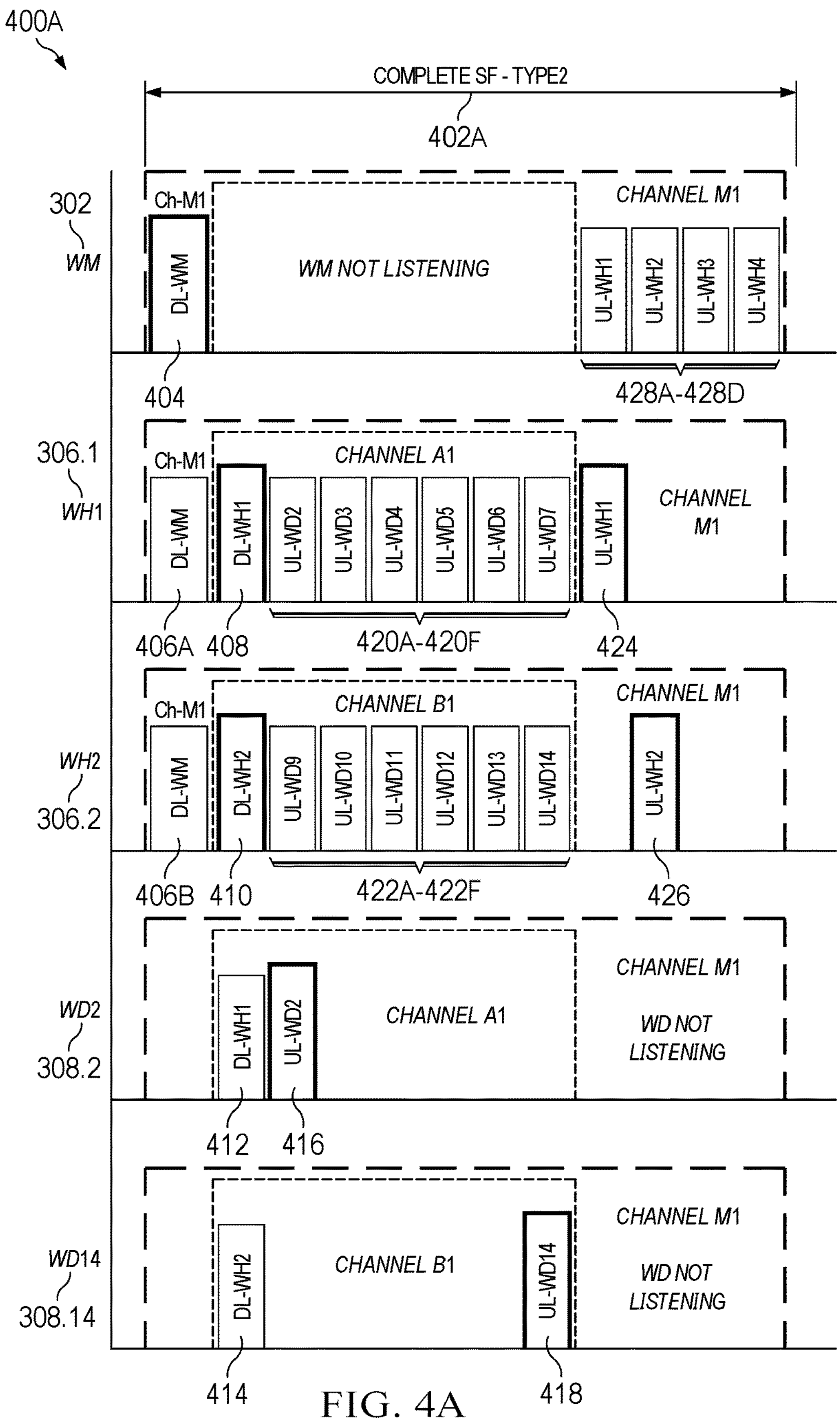
FIG. 4A is a block diagram of a super frame structure in accordance with various examples.
Figure 4B:
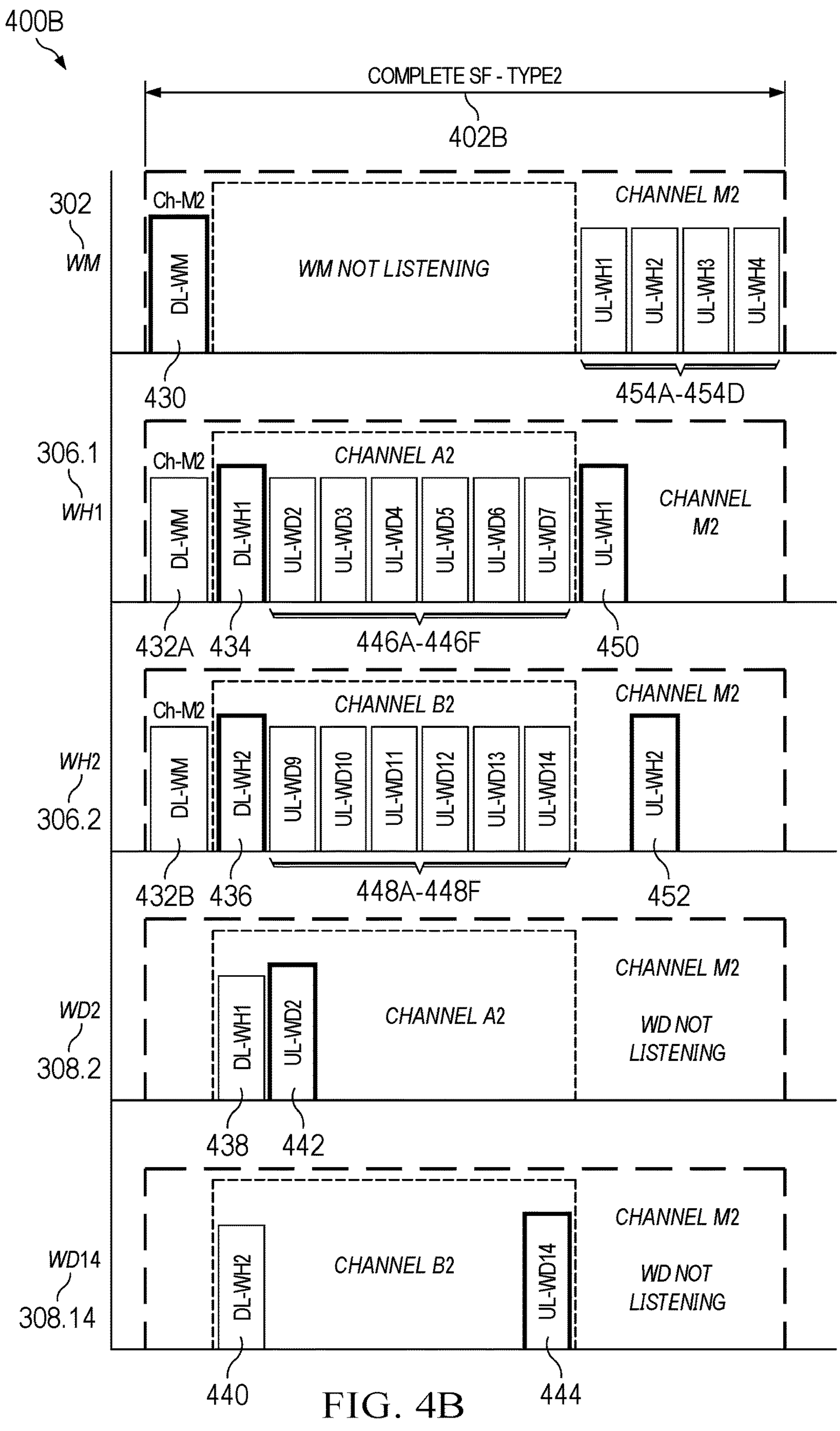
FIG. 4B is a block diagram of a super frame structure in accordance with various examples.

FIGS. 4A and 4B are block diagrams of a super frame structure 400A and 400B in accordance with various examples herein. This super frame structure is referred to as a Type 2 structure. The super frame structures 400A and 400B includes uplinks (UL) and downlinks (DL) for various devices that are shown on the left side of FIGS. 4A and 4B (WM 302, WH1 306.1, WH2 306.2, WD2 308.2, and WD14 308.14). The ULs and DLs shown in each row are the links either sent or received by the particular device listed on the left. For example, the top row of FIGS. 4A and 4B show the ULs and DLs associated with WM 302, either sent by WM 302 or received by WM 302. Likewise, the last rows of FIGS. 4A and 4B show the ULs and DLs associated with WD14 308.14, either sent by WD14 308.14 or received by WD14 308.14.

Super frame structure 400A includes a first super frame 402A, and super frame structure 400B includes a second super frame 402B. Super frame structures 400A and 400B includes various ULs and DLs 404 to 454. These ULs and DLs represent the communications between the devices in an example WBMS (e.g., WBMS 300). The details of each of the ULs and DLs 404 to 454 are described below.

Super frame structures 400A and 400B also show the channels that the devices in WBMS 300 are using for communication. In the first super frame 402A, channels M1, A1, and B1 are used. In the second super frame 402B, channels M2, A2, and B2 are used. The particular ULs and DLs that are transmitted on each channel are described below.

In WBMS 300, WM 302 communicates with WHs 306. WM 302 may send instructions or requests for battery cell information or battery management information to WHs 306. WHs 306 receive the instructions or requests, and then send instructions or requests to each WD 308 managed by the respective WH 306. The WDs 308 collect information (if needed) and respond to the WH 306 that manages the respective sub-cluster 304. Then, each WH 306 may be configured to aggregate the responses from the WDs 308 in its respective sub-cluster 304 and transmit a response to the WM 302. Therefore, the WHs 306 may be configured to act as intermediaries between the WM 302 and the WDs 308.

FIGS. 4A and 4B show one example process using super frame structures 400A and 400B. In the first super frame 402A in FIG. 4A, WM 302 sends a DL 404 (DL-WM) on channel M1 to each of the WHs 306. In this case, WH1 306.1 receives the DL 406A, and WH2 306.2 receives the DL 406B. DL 404 may contain instructions for the WHs 306 to query the WDs 308 in their respective sub-clusters 304 for information, such as a status of the battery cells 108. After WM 302 sends this DL 404, WM waits for the WHs 306 to receive responses from the WDs 308 and then provide those responses to WM 302. This is indicated in FIG. 4A as "WM not listening" during a portion of the first super frame 402A.

Responsive to DL 404, each WH 306 sends a DL to the WDs 308 in its respective sub-cluster 304. In this example, WH1 306.1 transmits a DL 408 (DL WH1) to WD2 through WD7 308. DL 408 is transmitted on channel A1. WH1 306.1 uses channel A1 to communicate with its WDs 308 in first super frame 402A. WH2 306.2 transmits a DL 410 (DL WH2) to WD9 through WD14 308. DL 410 is transmitted on channel B1. WH2 306.2 uses channel B1 to communicate with its WDs 308 in first super frame 402A. In this example, each sub-cluster 304 uses a different channel for communications between the WH 306 and the WDs 308 in the sub-cluster 304.

Each WD 308 receives the DL (408 or 410 in this example) from its respective WH 306. Only WD2 308.2 and WD14 308.14 are shown in FIG. 4A, but other WDs 308 operate similarly. WD2 308.2 receives DL 412, and WD14 308.14 receives DL 414. Each WD 308 responds to its respective WH 306 with an UL. Here, WD2 308.2 sends UL 416 to WH1 306.1 on channel A1. WD14 308.14 sends UL 418 to WH2 306.2 on channel B1. Although not shown in FIG. 4A, other WDs 308 also send an UL to their respective WH 306 on the appropriate channels.

After receiving ULs from each WD 308 in its sub-cluster, each WH 306 aggregates the information in the ULs from the WDs 308 in its sub-cluster and sends an UL to WM 302. Here, WH1 306.1 sends UL 424 to WM 302 on channel M1. WH2 306.2 sends UL 426 to WM 302 on channel M1. ULs 424 and 426 are sent at different times on channel M1 as shown, so they do not interfere with one another. WM 302 receives ULs 428A-428D from each WH 306 that it manages. At this time, first super frame 402A is complete and second super frame 402B begins.

In second super frame 402B in FIG. 4B, similar ULs and DLs as described above for first super frame 402A are transmitted. In second super frame 402B, different channels are used than the channels in first super frame 402A. Channel M2 is used instead of channel M1. Channel A2 is used instead of channel A1, and channel B2 is used instead of channel B1.

In second super frame 402B, WM 302 sends a DL 430 (DL-WM) on channel M2 to each of the WHs 306. In this case, WH1 306.1 receives the DL 432A, and WH2 306.2 receives the DL 432B. After WM 302 sends this DL 430, WM waits for the WHs 306 to receive responses from the WDs 308 and then provide those responses to WM 302.

Responsive to DL 430, each WH 306 sends a DL to the WDs 308 in its respective sub-cluster 304. In this example, WH1 306.1 transmits a DL 434 (DL WH1) to WD2 through WD7 308. DL 434 is transmitted on channel A2. WH2 306.2 transmits a DL 436 (DL WH2) to WD9 through WD14 308. DL 436 is transmitted on channel B2.

Each WD 308 receives the DL (434 or 436 in this example) from its respective WH 306. WD2 308.2 receives DL 438, and WD14 308.14 receives DL 440. Each WD 308 responds to its respective WH 306 with an UL. Here, WD2 308.2 sends UL 442 to WH1 306.1 on channel A2. WD14 308.14 sends UL 444 to WH2 306.2 on channel B2.

After receiving ULs from each WD 308 in its sub-cluster, each WH 306 aggregates the information in the ULs from the WDs 308 in its sub-cluster and sends an UL to WM 302. Here, WH1 306.1 sends UL 450 to WM 302 on channel M2. WH2 306.2 sends UL 452 to WM 302 on channel M2. WM 302 receives ULs 454A-454D from each WH 306 that it manages. At this time, second super frame 402B is complete and another super frame 402 may begin. The next super frame may hop channels again according to a master hopping sequence, and use channels M3, A3, and B3 for communication.

With the channel hopping sequence described herein, channels A and B could be derived from channel M using a set offset. For example, channel A could be found by calculating M-2, and channel B could be found by calculating M−4. Any other offset could be useful in other examples. Also, channel A or channel B could be channel M in one example. As shown in FIGS. 4A and 4B, if channel A is also channel M, those channels are not used at the same time in the super frames 402, and so there would be no interference. Any channel selection may be used so long as the transmissions on the channels do not collide with one another.

Any suitable process may be used for network formation in examples herein. In one example, WM 302 forms a network with all WHs 306 in a first phase. In the second phase, each WH 306 forms a network with its respective WDs 308.

The network topology may be provided by one of two examples. In the first example, WM 302 is aware of the network topology before formation. The other nodes are informed of the network topology during the scanning phase. The network topology may be enforced by whitelisting selected nodes according to the topology. In this example, only WHs 306 are allowed to pair with WM 302. Paired WHs 306 receive the list of respective WDs 308 with which to form sub-clusters 304. A WH 306 may be configured to whitelist only the list of received WDs 308 for its sub-cluster 304 to form the sub-cluster 304.

In the second example, every node is programmed with the clusterID it is supposed to join before network formation. Each WH 306 (and the WM 302) are programmed (before network formation) with the clusterIDs that each are going to be the master for. WM 302 is programmed with the clusterIDs of each WH 306, and each WH 306 is programmed with the clusterIDs of the respective WDs 308 in its sub-cluster 304. The clusterID is advertised in the scan requests. If any node receives a scanning request, that node sends a response only if the clusterID in the request matches.

Network formation may be performed in two phases. In phase one, WM 302 may be configured to perform a passive scan to select its Master ID. WDs 308 may be configured to refrain from taking part in phase one, which may be enforced by whitelisting at WM 302. The super frame format used may be a Type 1 format, which is described below. Scanning and pairing are performed for the WHs 306 to pair with WM 302. The scanning may be performed using configuration channels in one example. After phase one is complete, WM 302 switches the network to the master hopping sequence for the data channels. After the WHs 306 are paired with WM 302, phase two begins.

In phase two, WM 302 coordinates the WHs 306 to form their respective sub-clusters 304 through their own scanning and pairing phases. A dedicated hopping sequence is communicated to each paired WH 306 by WM 302 to use within mini-super frames for data exchange. The hopping sequence (described below) may be selected from a set of orthogonal hopping sequences or shifted hopping sequences. A super frame Type 2 structure may be used throughout for network formation and operation. Three options are described below for network formation: Options 1, 2, and 3. Option 3 introduces an extra super frame type, Type 3. The different options may have different speeds for network formation, with some options being faster than other options. However, the faster options may also be more complex than the slower options.

Figure 5:
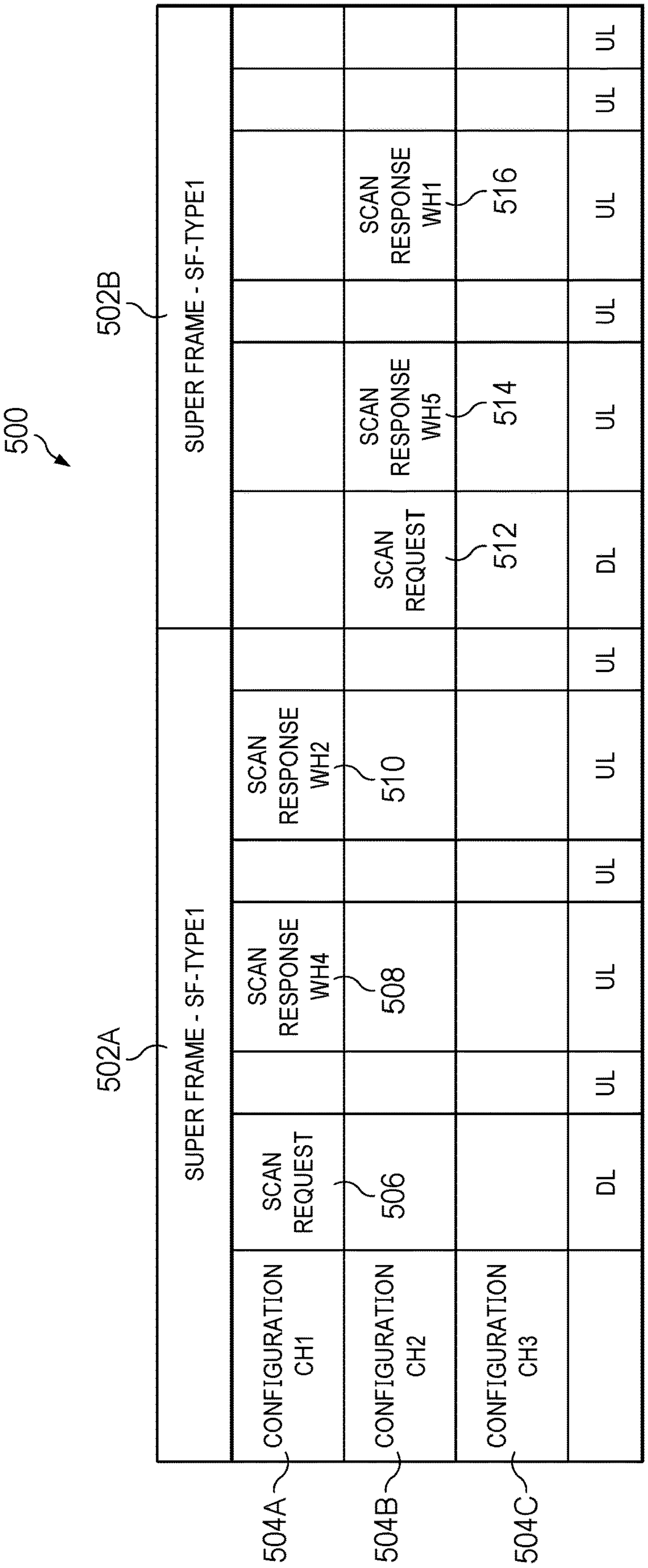
FIG. 5 is a super frame structure for network formation in accordance with various examples.

FIG. 5 is a Type 1 super frame structure 500 for network formation in accordance with various examples herein. Super frame structure 500 includes two super frames 502A and 502B in this example. Three configuration channels 504A, 504B, and 504C are shown in this example. Super frame structure 500 includes DLs 506 and 512, and ULs 508, 510, 514, and 516.

In the Type 1 super frame, the super frame duration includes 1 DL slot and N UL slots, where N is the number of WHs 306 managed by a WM 302. The Type 1 super frame may be useful in the WH 306 scanning and pairing phases described herein. In super frame 502A, WM 302 sends a DL scan request 506 on configuration channel 1 504A. WHs 306 may respond on configuration channel 1 504A in super frame 502A. In this example, WH4 sends a UL 508 scan response to WM 302. WH2 sends a UL 510 scan response to WM 302.

In super frame 502B, WM 302 sends a DL scan request 512 on configuration channel 2 504B. WHs 306 may respond on configuration channel 2 504B in super frame 502B. In this example, WH5 sends a UL 514 scan response to WM 302. WH1 sends a UL 516 scan response to WM 302.

Figure 6:
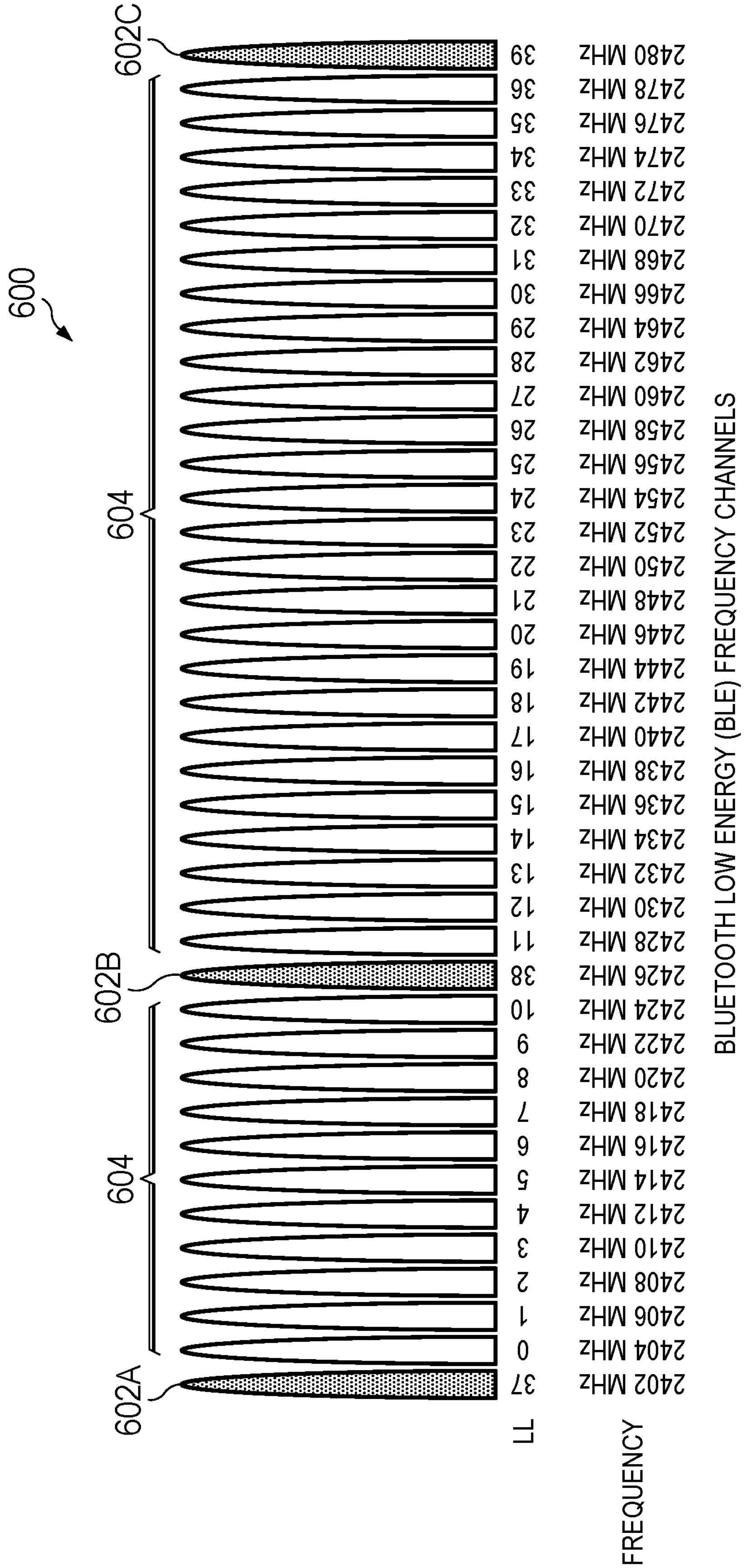
FIG. 6 shows data and configuration channels in accordance with various examples.

FIG. 6 shows data and configuration channels 600 in accordance with various examples herein. The channels 600 may be Bluetooth Low Energy (BLE) frequency channels in some examples, with the example frequencies shown in FIG. 6. This example includes three configuration or advertising channels (602A, 602B, and 602C), which are channels 37, 38, and 39. Channels 604 are the data channels, and includes channels 0 to 36, for a total of 37 data channels.

In examples herein, for each sub-cluster 304, WM 302 conveys the master hopping sequence and a unique offset to calculate the channel. The offset for a given sub-cluster 304 is subtracted from the channel number and wraps around over [0-36]. The offset also excludes the configuration channels 37, 38, and 39. For example, if a section of the master hopping sequence is for non-adjacent channels [5, 27, 0, 16] and the offset for a sub-cluster 304 is 3, the sub-cluster will follow channels [2, 24, 34, 13] while the MHS follows channels [5, 27, 0, 16]. The offset should be large enough to minimize adjacent channel interference. WM 302 needs to send only the master hopping sequence and the offsets to the WHs 306 in this example.

In some examples herein, measurement instant mismatch could occur due to the hierarchical structure. As an example, WM 302 may send an instruction to perform a measurement to the WHs 306, which in turn send that instruction to the WDs 308 in the respective sub-clusters 304. Therefore, the WHs 306 receive the instruction before the WDs 308. If the WHs perform the measurement before the WDs, measurement instant mismatch would occur, where the measurements for each node are not performed at the same time. Depending on the measurement performed, this mismatch could produce inaccurate data. In an example herein, the instructions may be delayed (e.g., in software) at the WHs 306 by an appropriate duration, so the measurements taken by the WHs 306 occur approximately at the same time as the measurements taken by the WDs 308.

In examples herein, each WH 306 receives data from N WDs 308 and forwards the aggregate data to WM 302 in its own timeslot (e.g., ULs 424 and 426 in FIG. 4A), which can be potentially longer than other timeslots. The duration of the aggregated UL timeslot (e.g., 424 and 426) is less than N times the original UL timeslots, because the WH 306 does not have to forward the entire frame from the WD 308, but only the payload and the identifying information of each WD 308. Therefore, this reduces the net overhead for forwarding the information from the N WDs 308 in comparison to a single tier network.

Figure 7A:
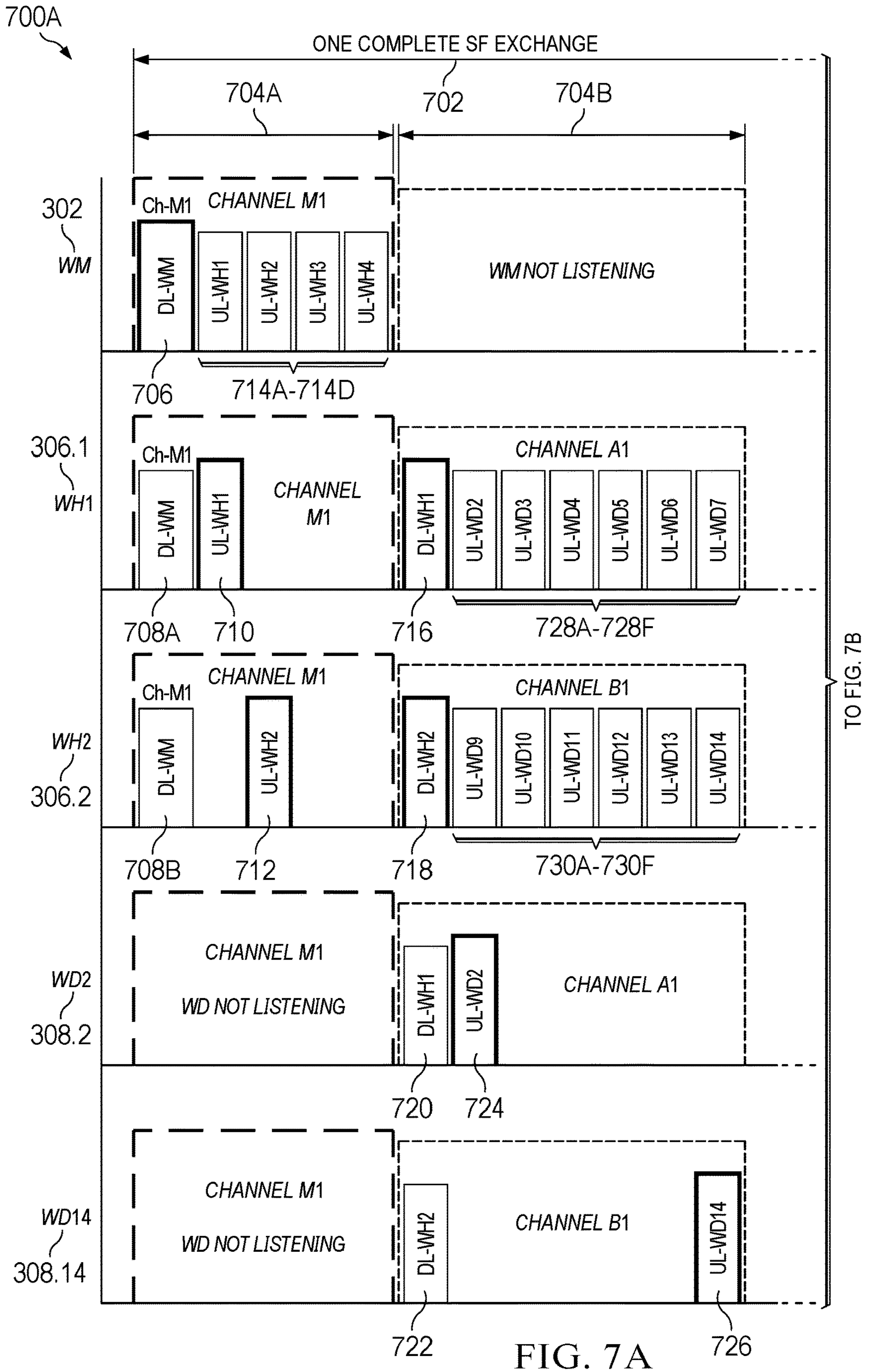
FIG. 7A is an alternative super frame structure in accordance with various examples.
Figure 7B:
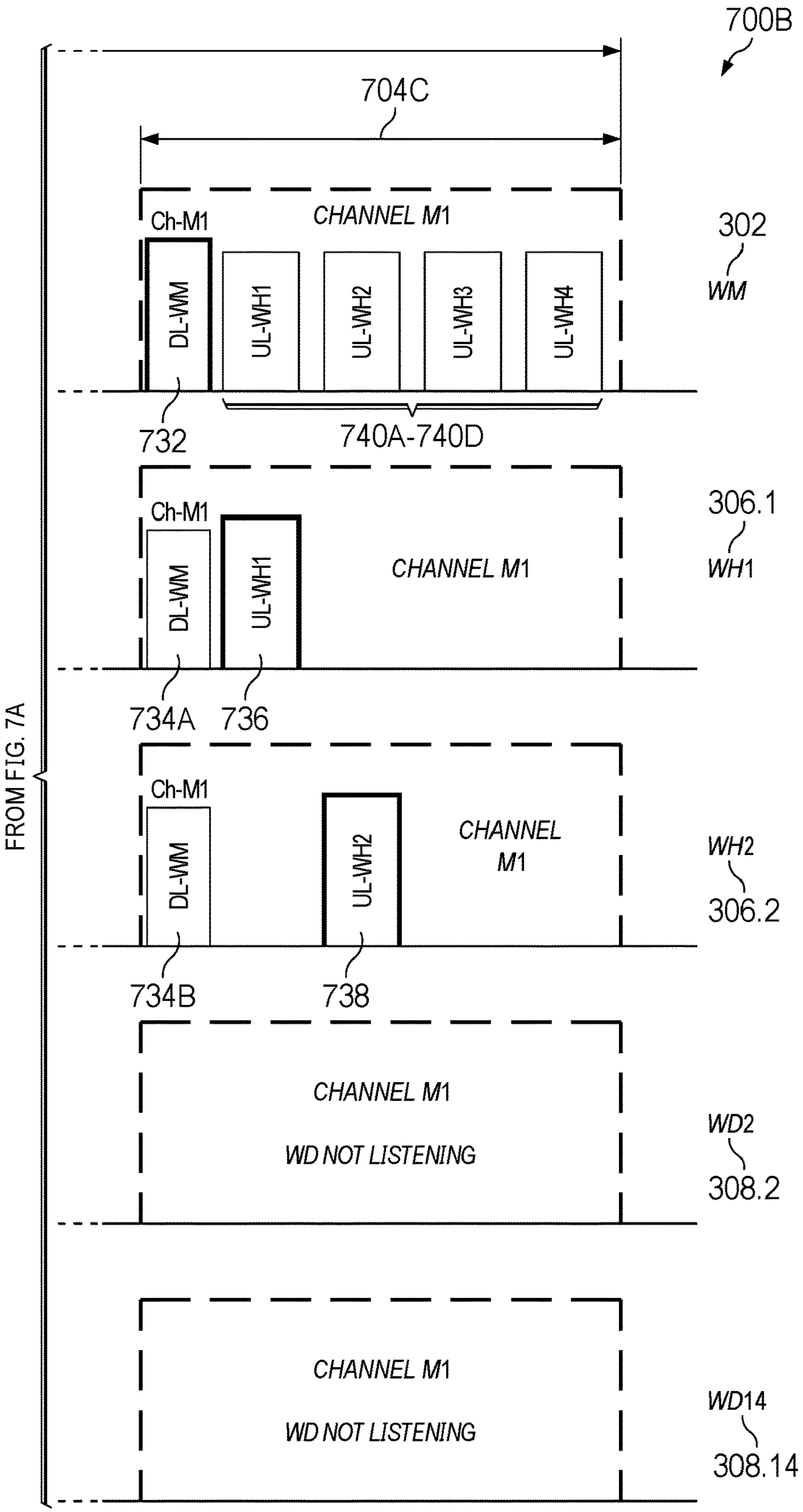
FIG. 7B is an alternative super frame structure in accordance with various examples.

FIGS. 7A and 7B are an alternative super frame structure 700A and 700B in accordance with various examples herein. In this example, WHs 306 receive a DL from WM 302, and then transmit back to WM 302 before transmitting to the WDs 308 in their respective sub-clusters 304. This example has a super frame 702 that is Type 2, but is broken into three Type 1 super frames (704A, 704B, and 704C). Super frames 704A, 704B, and 704C may be of different durations in some examples. Any number of WHs 306 and WDs 308 may be present in examples using super frame structures 700A and 700B. Super frame structures 700A and 700B may also be used in other examples described herein.

In this example, during Type 1 super frame 704A in FIG. 7A, WM 302 sends a DL 706 to WH1 306.1 and WH2 306.2 on channel M1. WH1 306.1 receives DL 708A, and WH2 306.2 receives DL 708B. WH1 306.1 responds with UL 710 on channel M1, and WH2 306.2 responds with UL 712 on channel M1. WM 302 receives ULs 714A-714D from all of the respective WHs 306 in the cluster. WDs 308 are not listening during super frame 704A. The ULs 714A-714D are extra frame transmissions that may not be present in other examples herein.

During Type 1 super frame 704B in FIG. 7A, WHs 306 transmit DLs to their respective WDs 308, and the WDs 308 respond with ULs. WM 302 is not listening at this time. In this example, WH1 306.1 sends a DL 716 to the WDs 308 in its sub-cluster 304 on channel A1. WH2 306.2 sends a DL 718 to the WDs 308 in its sub-cluster 304 on channel B1. WD2 308.2 receives DL 720 on channel A1. WD14 308.14 receives DL 722 on channel B1. WD2 308.2 sends UL 724 to WH1 306.1 on channel A1. WD14 308.14 sends UL 726 to WH2 306.2 on channel B1. Other WDs 308 (not shown in FIG. 7A) may send ULs to their respective WHs 306 as well during super frame 704B. These aggregated ULs may be longer than other ULs in some examples. WH1 306.1 receives ULs 728A-728F from its WDs 308. WH2 306.2 receives ULs 730A-730F from its WDs 308.

During Type 1 super frame 704C in FIG. 7B, WHs 306 aggregate the ULs from the respective WDs 308 and transmit the aggregated UL to WM 302. First, WM 302 sends a DL 732 to the WHs 306. WH1 306.1 receives the DL 734A, and WH2 306.2 receives the DL 734B. Each WH 306 aggregates the UL from the WDs 308 in the respective sub-clusters 304 and transmits those aggregated ULs to WM 302. As discussed above, each of the WHs 306 may be configured to generate an aggregated UL based on the ULs received from the WDs 308 in the respective sub-cluster. WH1 306.1 transmits UL 736 to WM 302 on channel M1, and WH2 306.2 transmits 738 to WM 302 on channel M1. WM 302 receives ULs 740A-740D on channel M1 in the super frame 704C.

Figure 8A:
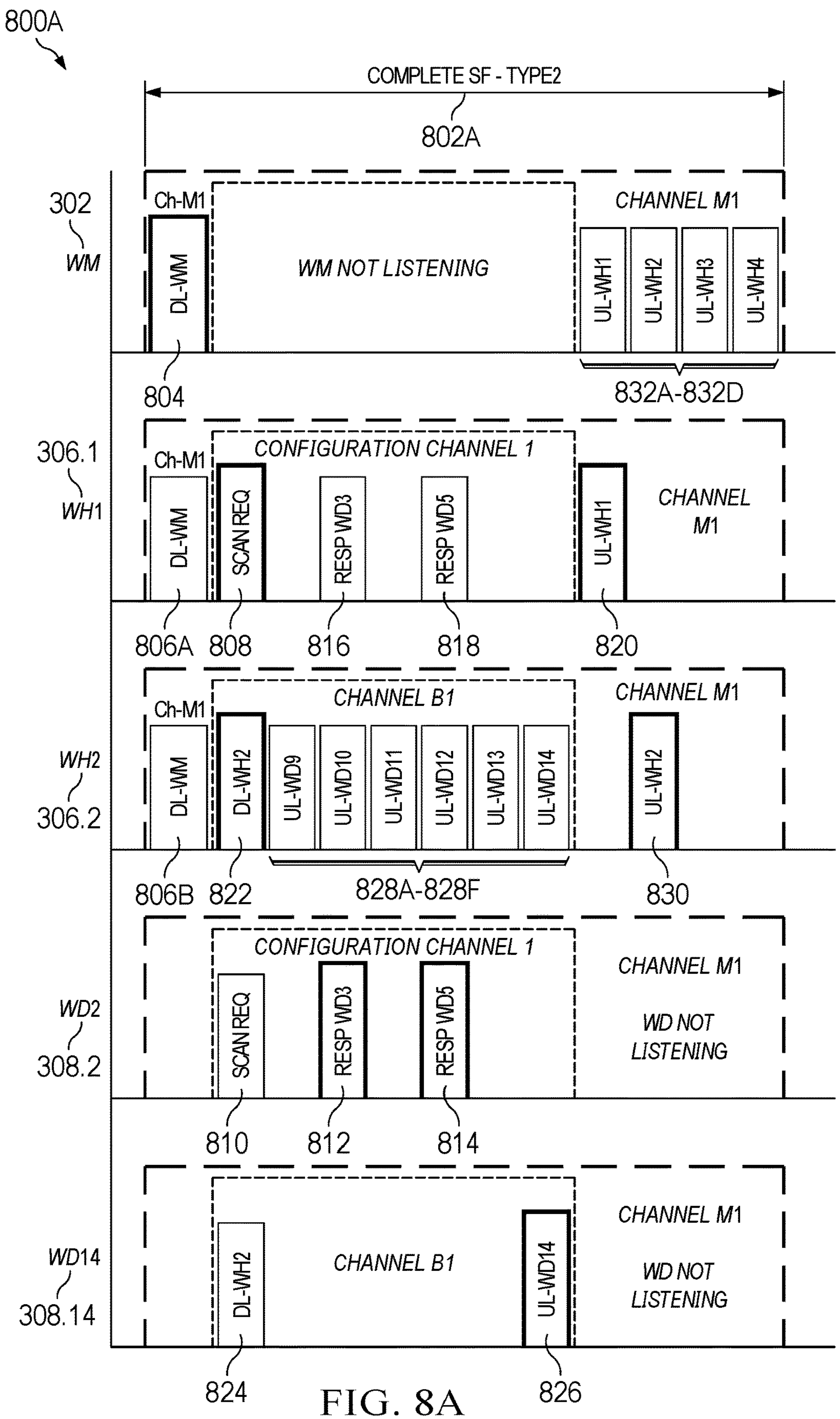
FIG. 8A is a super frame structure for network formation in accordance with various examples.
Figure 8B:
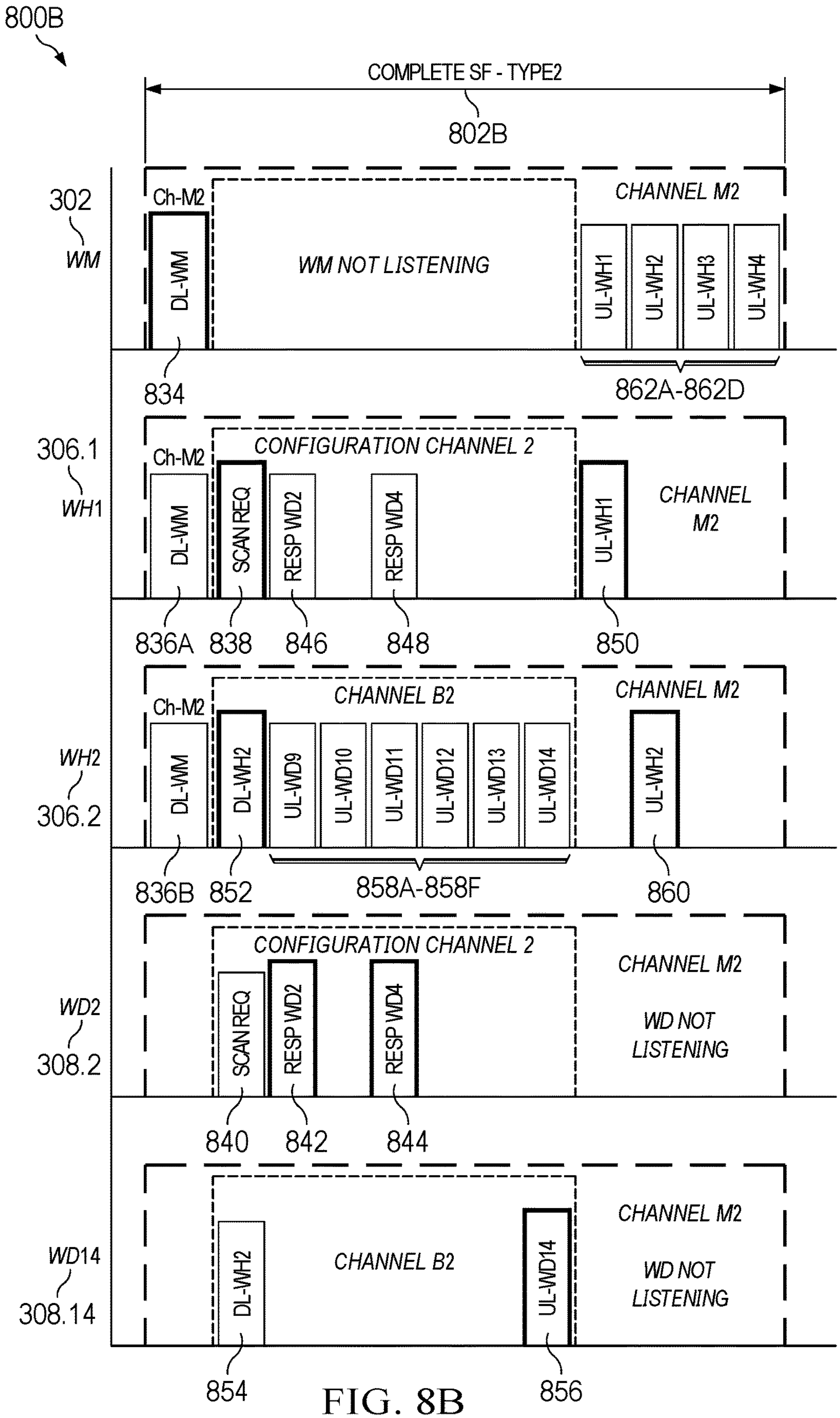
FIG. 8B is a super frame structure for network formation in accordance with various examples.

FIGS. 8A and 8B are super frame structures 800A and 800B for network formation in accordance with various examples herein. FIGS. 8A and 8B provide an example of network formation Option 1. In Option 1, sub-clusters 304 are formed one after the other, with a process coordinated by WM 302. One sub-cluster 304 is formed (e.g., scanning and pairing) at a time. A similar scanning and pairing mechanism is used for each sub-cluster 304 using the configuration channels. Each WH 306 may be configured to use its whitelist received from WM 302 for admission control of the WDs 308. Any WH 306 that is in the network formation phase uses only configuration channels. After the sub-cluster 304 is formed, the sub-cluster 304 follows its hopping sequence as instructed by WM 302. The main cluster also follows the master hopping sequence.

In each Type 2 super frame in this example, the corresponding WH 306 reports back to WM 302 the status of its sub-cluster 304 formation. After a WH 306 (e.g., WHN) completes forming its sub-cluster 304, WM 302 instructs the next WH 306 (e.g., WH(N+1)) to form its cluster beginning from the next Type 2 super frame. After any sub-cluster 304 is formed, that sub-cluster 304 switches to its hopping sequence derived from the master hopping sequence. The sub-cluster 304 is then in the network operation phase, where it participates in normal data exchange as described above with respect to FIGS. 4A and 4B, for example. After network formation is completed for all sub-clusters 304 and confirmed by each WH 306 to WM 302, all sub-clusters 304 are in normal data exchange operation.

Super frame structures 800A and 800B show an example of Option 1 network formation. Super frame structure 800A includes super frame 802A, and super frame structure 800B includes super frame 802B, which are Type 2 super frames. In super frame 802A, WH1 306.1 is in the network formation phase. WH2 306.2 has already completed its network formation, and is in the normal data exchange phase. The process begins with WM 302 sending DL 804 to each WH 306 in the cluster. WH1 306.1 receives DL 806A, and WH2 306.2 receives DL 806B in this example. DL 804 contains an indication that WH1 306.1 is in the scanning phase, and WH2 306.2 has completed network formation. Other WHs 306 that have not completed their scanning phase will wait for WH1 306.1 to complete its scanning phase. Other WHs 306 that have completed their scanning phases may engage in normal data exchange operation, such as WH2 306.2 in this example. DL 804 may also contain an acknowledgement for UL frames from all WHs 306.

WH1 306.1 then conducts its scanning phase. WH1 306.1 transmits a scan request DL 808 to each WD 308 in its respective sub-cluster 304 on configuration channel 1. As shown, a WD 308 in this sub-cluster (such as WD2 308.2) receives the scan request in DL 810. The WDs 308 in the sub-cluster for WH1 306.1 then send individual responses back to WH1 306.1 on configuration channel 1. In super frame 802A, a WD3 308 sends UL 812 to WH1 306.1, and a WD5 308 sends UL 814 to WH1 306.1. ULs 812 and 814 are not sent by WD2 308.2, but are shown on the row for WD2 308.2 for simplicity. WH1 306.1 receives these responsive ULs 816 and 818, respectively. WH1 306.1 aggregates the responses from its WDs 308 and transmits those to WM 302 with UL 820 on channel M1. UL 820 may note that WH1 306.1 is in the scanning phase, and include an acknowledgement for the last frame from WM 302.

While WH1 306.1 is scanning in super frame 802A, WH2 306.2 is performing the normal data exchange with the WDs 308 in its sub-cluster. WH2 306.2 transmits a DL 822 on channel B1. In this example, WDs 308.9 to 308.14 are in the sub-cluster 304 managed by WH2 306.2. Only WH14 308.14 is shown here for simplicity. Each WD 308 in this sub-cluster 304 receives a DL on channel B1, such as DL 824 received by WD14 308.14. Each WD 308 sends a response to WH2 306.2, such as the UL 826 from WD14 308.14. WH2 306.2 receives ULs 828A-828F from the WDs 308 in its sub-cluster 304 on channel B1. WH2 306.2 aggregates the responses and provides a UL 830 to WM 302 on channel M1. UL 830 may indicate that WH2 306.2 has completed its network formation phase, and contains aggregated data from WDs 308 in the respective sub-cluster 304. UL 830 may also include an acknowledgement for the last frame from WM 302. ULs 832A-832D are received at WM 302 in this example, but the system may include any number of sub-clusters 304 and WHs 306. This marks the end of super frame 802A.

In super frame 802B in FIG. 8B, a similar process occurs as that discussed above with respect to super frame 802A. In super frame 802B, WH1 306.1 has not yet completed the scanning and pairing phase, so it continues scanning and pairing with un-paired WDs 308 in its sub-cluster 304. WH2 306.2 continues normal data exchange with its respective WDs 308.

WM 302 sends DL 834 to each WH 306 in the cluster on channel M2. WH1 306.1 receives DL 836A, and WH2 receives DL 836B in this example. DL 834 may be similar to DL 804 described above.

WH1 306.1 transmits a scan request DL 838 to each WD 308 in its respective sub-cluster 304 on configuration channel 2. As shown, a WD 308 in this sub-cluster (such as WD2 308.2) receives the scan request in DL 840. The WDs 308 in the sub-cluster for WH1 306.1 then send individual responses back to WH1 306.1 on configuration channel 2, for those WDs 308 that did not pair with WH1 306.1 in a previous sub frame 802. In super frame 802B, a WD2 308.2 sends UL 842 to WH1 306.1, and a WD4 308 sends UL 844 to WH1 306.1. WH1 306.1 receives these responsive ULs 846 and 848, respectively. WH1 306.1 aggregates the responses from its WDs 308 and transmits those to WM 302 with UL 850 on channel M2. UL 850 may be similar to UL 820 described above.

While WH1 306.1 is scanning in super frame 802B, WH2 306.2 is performing the normal data exchange with the WDs 308 in its sub-cluster, as it did in super frame 802A. WH2 306.2 transmits a DL 852 on channel B2. Each WD 308 in the sub-cluster 304 managed by WH2 306.2 receives a DL on channel B2, such as DL 854 received by WD14 308.14. Each WD 308 sends a response to WH2 306.2, such as the UL 856 from WD14 308.14. WH2 306.2 receives ULs 858A-858F from the WDs 308 in its sub-cluster 304 on channel B2. WH2 306.2 aggregates the responses and provides a UL 860 to WM 302 on channel M2. UL 860 may be similar to UL 830 described above. ULs 862A-862D are received at WM 302 in this example, but the system may include any number of sub-clusters 304 and WHs 306. This marks the end of super frame 802B. FIGS. 8A and 8B therefore describe Option 1 for network formation.

Figure 9A:
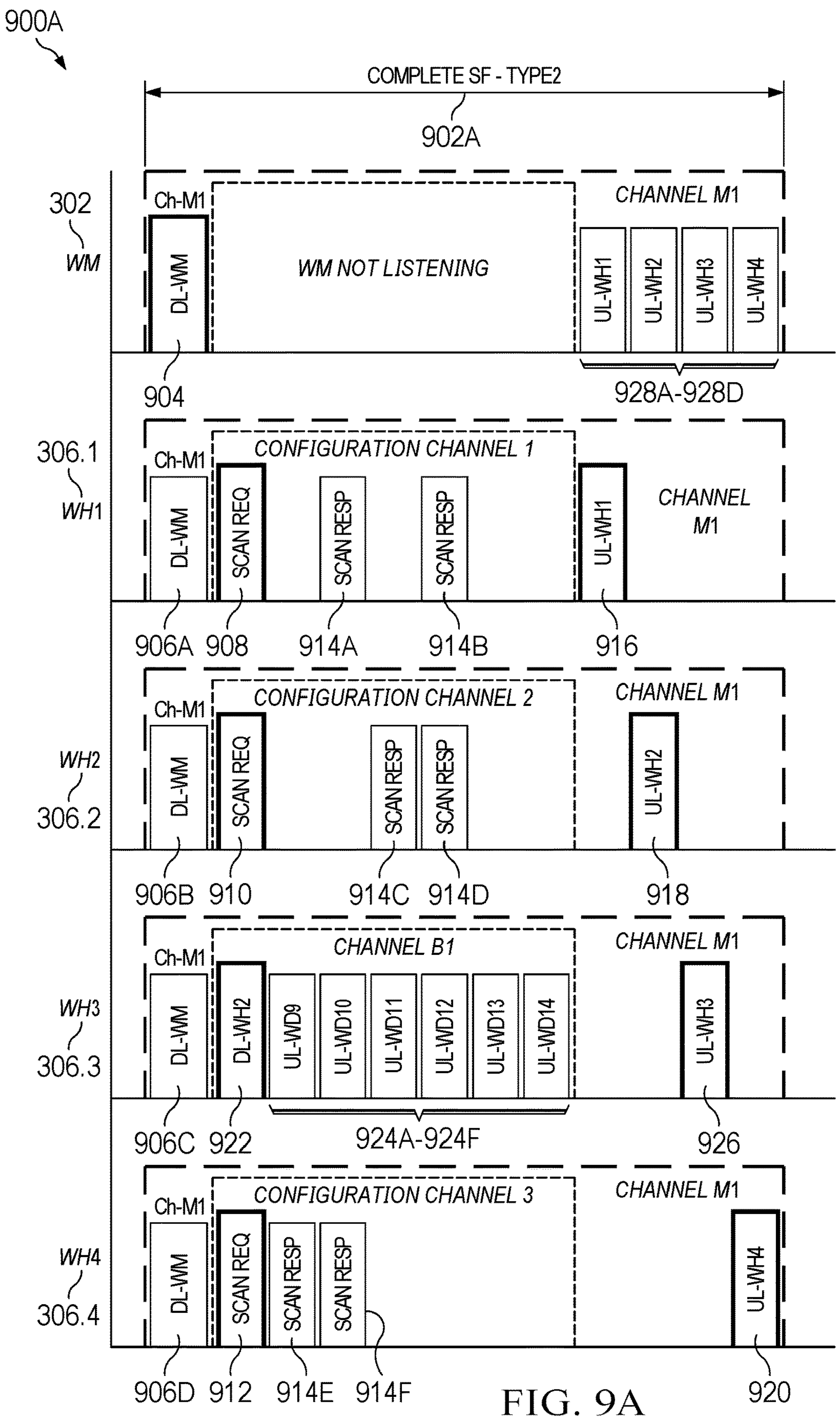
FIG. 9A is a super frame structure for network formation in accordance with various examples.
Figure 9B:
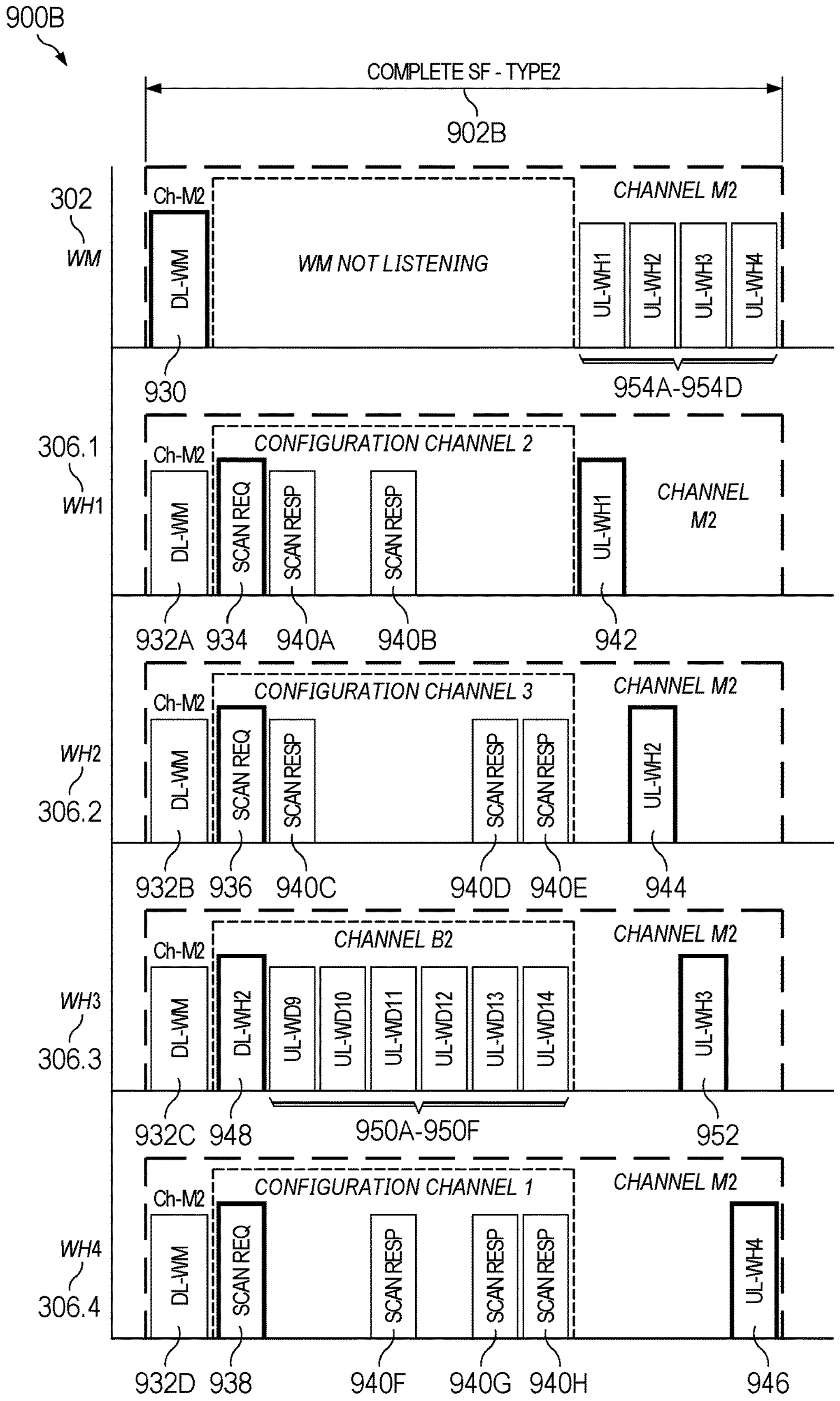
FIG. 9B is a super frame structure for network formation in accordance with various examples.

FIGS. 9A and 9B show a super frame structures 900A and 900B for network formation in accordance with various examples herein. FIGS. 9A and 9B provide an example of network formation Option 2. In Option 2, a group of sub-clusters 304 are formed at the same time, rather than one at a time as in Option 1. In Option 2, three sub-clusters 304 may be formed at a time using the three configuration channels. In other examples, more sub-clusters 304 may be formed at a time if more configuration channels are available.

Sub-cluster 304 formation in Option 2 is coordinated by WM 302. Each WH 306 is instructed to use one of the configuration channels by WM 302, and the configuration channels will be rotated each super frame. A similar scanning and pairing mechanism as described above in Option 1 may be used for each sub-cluster 304 in the configuration channels. The cluster uses the master hopping sequence as described herein. In each Type 2 super frame, the corresponding WHs 306 report back to WM 302 the status of their sub-cluster 304 formation. After any of the current three sub-clusters 304 are formed, WM 302 instructs a new WH 306 or a new set of WHs 306 to begin network formation. After any sub-cluster is 304 is formed, that sub-cluster 304 switches to its derived hopping sequence derived from the master hopping sequence for normal data exchange. Option 2 may be three times as fast as Option 1, but uses the same super frame structure and timing.

Super frame structures 900A and 900B show an example of Option 2 network formation. Super frame structure 900A includes super frame 902A, and super frame structure 900B includes super frame 902B, which are Type 2 super frames. In super frame 902A, WH1 306.1, WH2 306.2, and WH4 306.4 are in the network formation phase. WH3 306.3 has already completed its network formation, and is in the normal data exchange phase. In this example, no WDs 308 are shown, but the WHs 306 communicate with the WDs 308 in their respective sub-clusters 304 as described above with Option 1.

For Option 2, the process begins in super frame 902A with WM 302 sending DL 904 to each WH 306 in the cluster. WH1 306.1 receives DL 906A, WH2 306.2 receives DL 906B, WH3 306.3 receives DL 906C, and WH4 306.4 receives DL 906D. DL 904 from WM 302 contains an indication that WH1 306.1. WH2 306.2, and WH4 306.4 are in the scanning or network formation phase, and WH3 306.3 has completed network formation. WM 302 assigns the selected configuration channels to WH1 306.1. WH2 306.2, and WH4 306.4. WH3 306.3 follows the master hopping sequence. Other WHs 306 that have not yet formed their networks will not transmit until WM 302 assigns them a configuration channel.

Each WH 306 in the network formation phase transmits a scan request DL to each WD 308 in its respective sub-cluster 304 on its respective configuration channel. WH1 306.1 sends DL 908 on configuration channel 1, WH2 306.2 sends DL 910 on configuration channel 2, and WH4 306.4 sends DL 912 on configuration channel 3. Then the WDs 308 (not shown) for each WH 306 respond with ULs back to their respective WHs 306 for pairing. In this example, WH1 306.1 receives ULs 914A and 914B from its WDs 308, WH2 306.2 receives ULs 914C and 914D from its WDs 308, and WH4 306.4 receives ULs 914E and 914F from its WDs 308. Then, each WH 306 aggregates the ULs it received from its WDs 308 and transmits a UL to WM 302 on channel M1. Here, WH1 306.1 sends UL 916, WH2 306.2 sends UL 918, and WH4 306.4 sends UL 920.

During super frame 902A, while WH1 306.1, WH2 306.2, and WH4 306.4 are in the scanning phase, WH3 306.3 is performing normal data exchange with its WDs 308. WH3 306.3 transmits a DL 922 to its WDs 308 on channel B1. The WDs 308 respond to WH3 306.3 with ULs 924A to 924F on channel B1. WH3 306.3 aggregates the responses from the WDs 308 and transmits UL 926 to WM 302. UL 926 indicates that WH3 306.3 has ended its network formation phase and includes aggregated data from all WDs 308 in WH3's 306.3 sub-cluster. WM 302 receives ULs 928A-928D (one from each WH 306 in the cluster) and super frame 902A ends.

In super frame 902B in FIG. 9B, a similar process occurs as that discussed above with respect to super frame 902A. In super frame 902B, WH1 306.1, WH2 306.2, and WH4 306.4 have not yet completed the scanning and pairing phase, so those WHs 306 continue scanning and pairing with un-paired WDs 308 in their respective sub-cluster 304. WH1 306.1, WH2 306.2, and WH4 306.4 may be configured to use different configuration channels in super frame 902B, as compared to the configuration channels used by each respective WH in super frame 902A. WH3 306.3 continues normal data exchange with its respective WDs 308.

The process in super frame 902B begins with WM 302 sending DL 930 to each WH 306 in the cluster on channel M2. WH1 306.1 receives DL 932A, WH2 306.2 receives DL 932B, WH3 306.3 receives DL 932C, and WH4 306.4 receives DL 932D. DL 930 may be similar to DL 904 described above.

Each WH 306 in the network formation phase transmits a scan request DL to each WD 308 in its respective sub-cluster 304 on its respective configuration channel. WH1 306.1 sends DL 934 on configuration channel 2, WH2 306.2 sends DL 936 on configuration channel 3, and WH4 306.4 sends DL 938 on configuration channel 1. Then the WDs 308 (not shown) for each WH 306 respond with ULs back to their respective WHs 306 for pairing. In this example, WH1 306.1 receives ULs 940A and 940B from its WDs 308, WH2 306.2 receives ULs 940C, 940D, and 940E from its WDs 308, and WH4 306.4 receives ULs 940F, 940G, and 940H from its WDs 308. Then, each WH 306 aggregates the ULs it received from its WDs 308 and transmits a UL to WM 302 on channel M2. Here, WH1 306.1 sends UL 942, WH2 306.2 sends UL 944, and WH4 306.4 sends UL 946.

During super frame 902B, while WH1 306.1, WH2 306.2, and WH4 306.4 are in the scanning phase, WH3 306.3 is performing normal data exchange with its WDs 308 (similar to super frame 902A). WH3 306.3 transmits a DL 948 to its WDs 308 on channel B2. The WDs 308 respond to WH3 306.3 with ULs 950A to 950F on channel B2. WH3 306.3 aggregates the responses from the WDs 308 and transmits UL 952 to WM 302. WM 302 receives ULs 954A-954D (one from each WH 306 in the cluster) and super frame 902B ends.

Option 2 in FIGS. 9A and 9B shows that the configuration channels are rotated during each super frame 902 for the WHs 306 that are in the network formation phase, as noted above. FIGS. 9A and 9B therefore describe Option 2 for network formation.

Figure 10A:
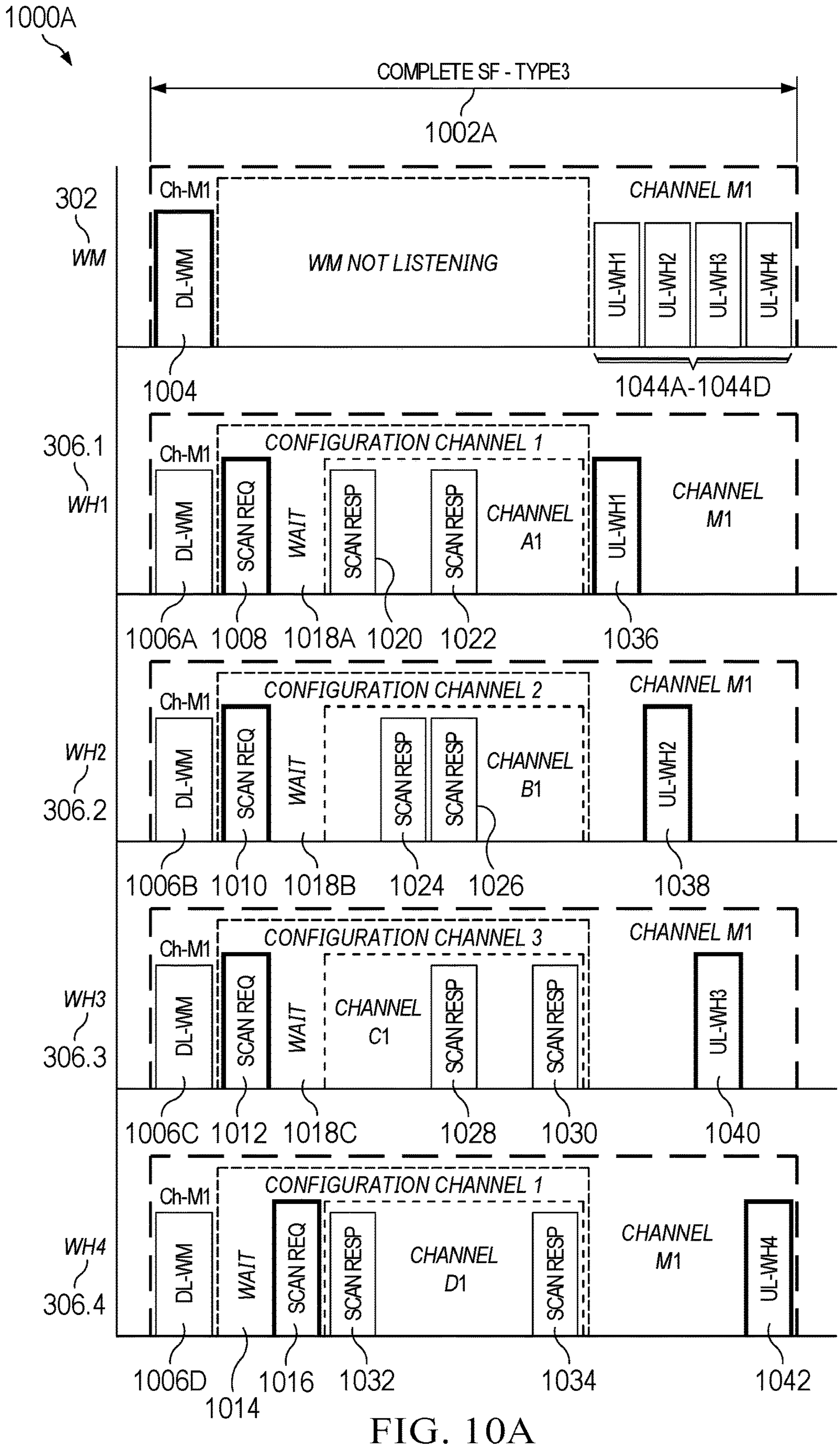
FIG. 10A is a super frame structure for network formation in accordance with various examples.
Figure 10B:
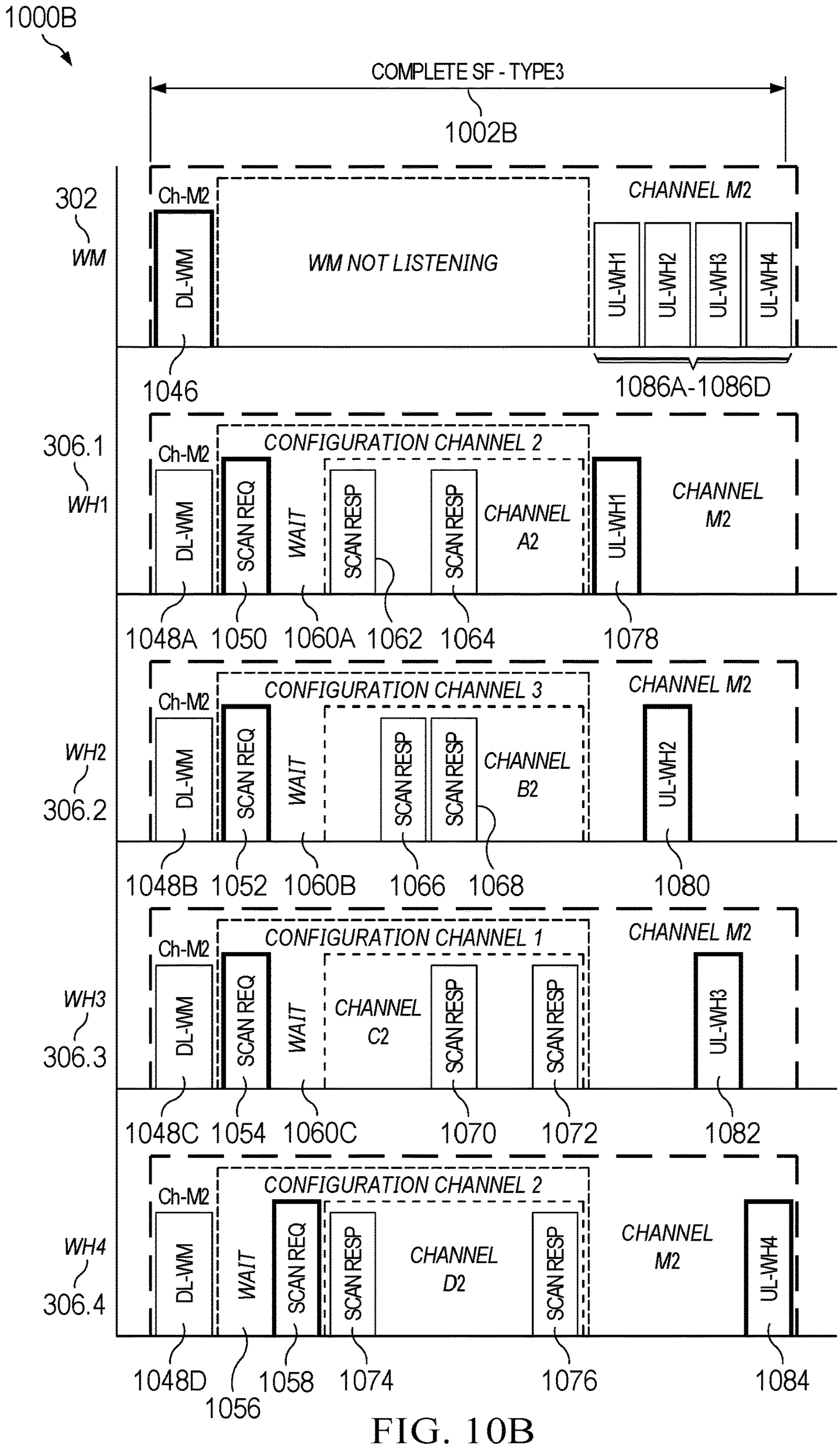
FIG. 10B is a super frame structure for network formation in accordance with various examples.

FIGS. 10A and 10B are super frame structures 1000A and 1000B for network formation in accordance with various examples herein. FIGS. 10A and 10B provide an example of network formation Option 3. Option 3 is more complex than Options 1 or 2. In Option 3, a new super frame type (Type 3) is used until all sub-clusters 304 are formed. Super frame Type 3 is similar to Type 2, but Type 3 has a mini super frame within the super frame that is longer than in Type 2. With Type 3, all sub-clusters 304 are formed simultaneously, with a process that is coordinated by WM 302. Each WH 306 is instructed by WM 302 to use one of the configuration channels for each mini super frame, and the configuration channel will be rotated from super frame to super frame. After network formation is complete, the network switches to super frame Type 2 for normal data exchange. The main cluster follows the master hopping sequence. In each Type 3 super frame, all WHs 306 report back to WM 302 the status of their sub-cluster 304 formation. After a WH 306 completes its sub-cluster 304 formation, the WH 306 switches its sub-cluster 304 to the proper hopping sequence within the mini super frame. After all sub-clusters 304 are formed, WM 302 switches the network to super frame Type 2.

Super frame structures 1000A and 1000B show an example of Option 3 network formation. Super frame structures 1000A and 100B include super frames 1002A and 1002B, respectively, which are Type 3 super frames. In super frame 1002A, WH1 306.1, WH2 306.2, WH3 306.3, and WH4 306.4 are in the network formation phase. In this example, no WDs 308 are shown, but the WHs 306 communicate with the WDs 308 in their respective sub-clusters 304 as described above with Options 1 and 2.

For Option 3, the process begins in super frame 1002A in FIG. 10A with WM 302 sending DL 1004 to each WH 306 in the cluster. WH1 306.1 receives DL 1006A, WH2 306.2 receives DL 1006B, WH3 306.3 receives DL 1006C, and WH4 306.4 receives DL 1006D. DL 1004 from WM 302 contains an indication that WH1 306.1, WH2 306.2, WH3 306.3, and WH4 306.4 are in the scanning or network formation phase. WM 302 assigns the selected configuration channels and data channels to WH1 306.1. WH2 306.2, WH3 306.3, and WH4 306.4.

Each WH 306 in the network formation phase transmits a scan request DL to each WD 308 in its respective sub-cluster 304 on its respective configuration channel. WH1 306.1 sends DL 1008 on configuration channel 1, WH2 306.2 sends DL 1010 on configuration channel 2, and WH3 306.3 sends DL 1012 on configuration channel 3. Because there are four WHs 306 but only three configuration channels, WH4 306.4 must wait in a waiting period 1014 for a configuration channel to become available. After DLs 1008, 1010, and 1012 are sent, the configuration channels are open, and WM 302 assigns configuration channel 1 to WH4 306.4. WH4 306.4 then sends DL 1016 to its WDs 308 in its sub-cluster 304. During the time that DL 1016 is transmitted, the other WHs 306 wait for DL 1016 to conclude. These waiting periods are shown as 1018A, 1018B, and 1018C for the first three WHs 306.

After the scan request DLs are sent to WDs 308, the WDs 308 respond to their respective WH 306 in the mini super frame. For this response, data channels are used rather than configuration channels. WH1 306.1 uses channel A1, WH2 306.2 uses channel B1, WH3 306.3 uses channel C1, and WH4 306.4 uses channel D1. WH1 306.1 receives ULs 1020 and 1022, WH2 306.2 receives ULs 1024 and 1026, WH3 306.3 receives ULs 1028 and 1030, and WH4 306.4 receives ULs 1032 and 1034.

After the ULs have been received by the WHs 306 from the WDs 308, each WH 306 aggregates the responses from its WDs 308 and sends a UL to WM 302 on channel M1. WH1 306.1 sends UL 1036, WH2 306.2 sends UL 1038, WH3 306.3 sends UL 1040, and WH4 306.4 sends UL 1042. WM 302 receives ULs 1044A-1044D, and super frame 1002A concludes.

Super frame 1002B in FIG. 10B operates similarly to super frame 1002A. In this example, none of the WHs 306 have completed their network formation in super frame 1002A, so network formation continues in super frame 1002B.

The process begins in super frame 1002B with WM 302 sending DL 1046 to each WH 306 in the cluster. WH1 306.1 receives DL 1048A, WH2 306.2 receives DL 1048B, WH3 306.3 receives DL 1048C, and WH4 306.4 receives DL 1048D. DL 1004 from WM 302 contains an indication that WH1 306.1, WH2 306.2, WH3 306.3, and WH4 306.4 are in the scanning or network formation phase. WM 302 assigns the selected configuration channels and data channels to WH1 306.1, WH2 306.2, WH3 306.3, and WH4 306.4.

Each WH 306 in the network formation phase transmits a scan request DL to each WD 308 in its respective sub-cluster 304 on its respective configuration channel. WH1 306.1 sends DL 1050 on configuration channel 2, WH2 306.2 sends DL 1052 on configuration channel 3, and WH3 306.3 sends DL 1054 on configuration channel 1. WH4 306.4 waits in a waiting period 1056 for a configuration channel to become available. After DLs 1050, 1052, and 1054 are sent, the configuration channels are open, and WM 302 assigns configuration channel 2 to WH4 306.4. WH4 306.4 then sends DL 1058 to its WDs 308 in its sub-cluster 304. During the time that DL 1058 is transmitted, the other WHs 306 wait for DL 1058 to conclude. These waiting periods are shown as 1060A, 1060B, and 1060C for the first three WHs 306.

After the scan request DLs are sent to WDs 308, the WDs 308 respond to their respective WH 306 in the mini super frame. For this response, data channels are used rather than configuration channels, as they were in super frame 1002A. The data channels rotate for this super frame 1002B, just as the configuration channels rotated. WH1 306.1 uses channel A2, WH2 306.2 uses channel B2, WH3 306.3 uses channel C2, and WH4 306.4 uses channel D2. WH1 306.1 receives ULs 1062 and 1064, WH2 306.2 receives ULs 1066 and 1068, WH3 306.3 receives ULs 1070 and 1072, and WH4 306.4 receives ULs 1074 and 1076.

After the ULs have been received by the WHs 306 from the WDs 308, each WH 306 aggregates the responses from its WDs 308 and sends a UL to WM 302 on channel M2. WH1 306.1 sends UL 1078, WH2 306.2 sends UL 1080, WH3 306.3 sends UL 1082, and WH4 306.4 sends UL 1084. WM 302 receives ULs 1086A-1086D, and super frame 1002B concludes.

If any WH 306 completes forming its sub-cluster 304, the WH 306 continues sending DL frames in the allocated configuration channels and receiving UL frames in the appropriate hopping sequence. This process continues until all sub-clusters 304 are formed and WM 302 informs all the WHs 306 to switch to super frame Type 2. In some examples, Option 3 is more complex than Options 1 or 2 but also may be faster if there are a large number of sub-clusters 304.

Figure 11A:
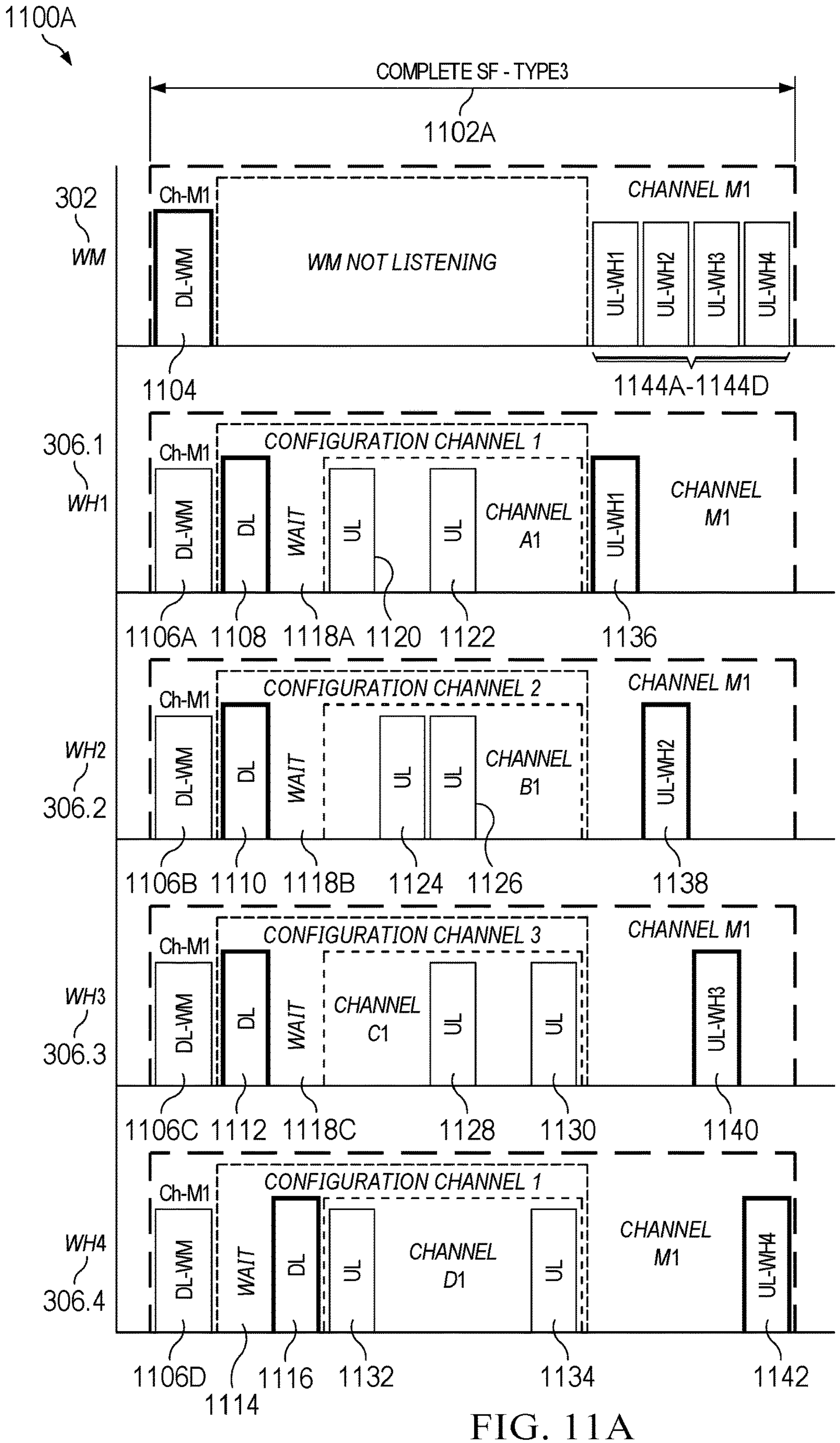
FIG. 11A is a super frame structure for network formation in accordance with various examples.
Figure 11B:
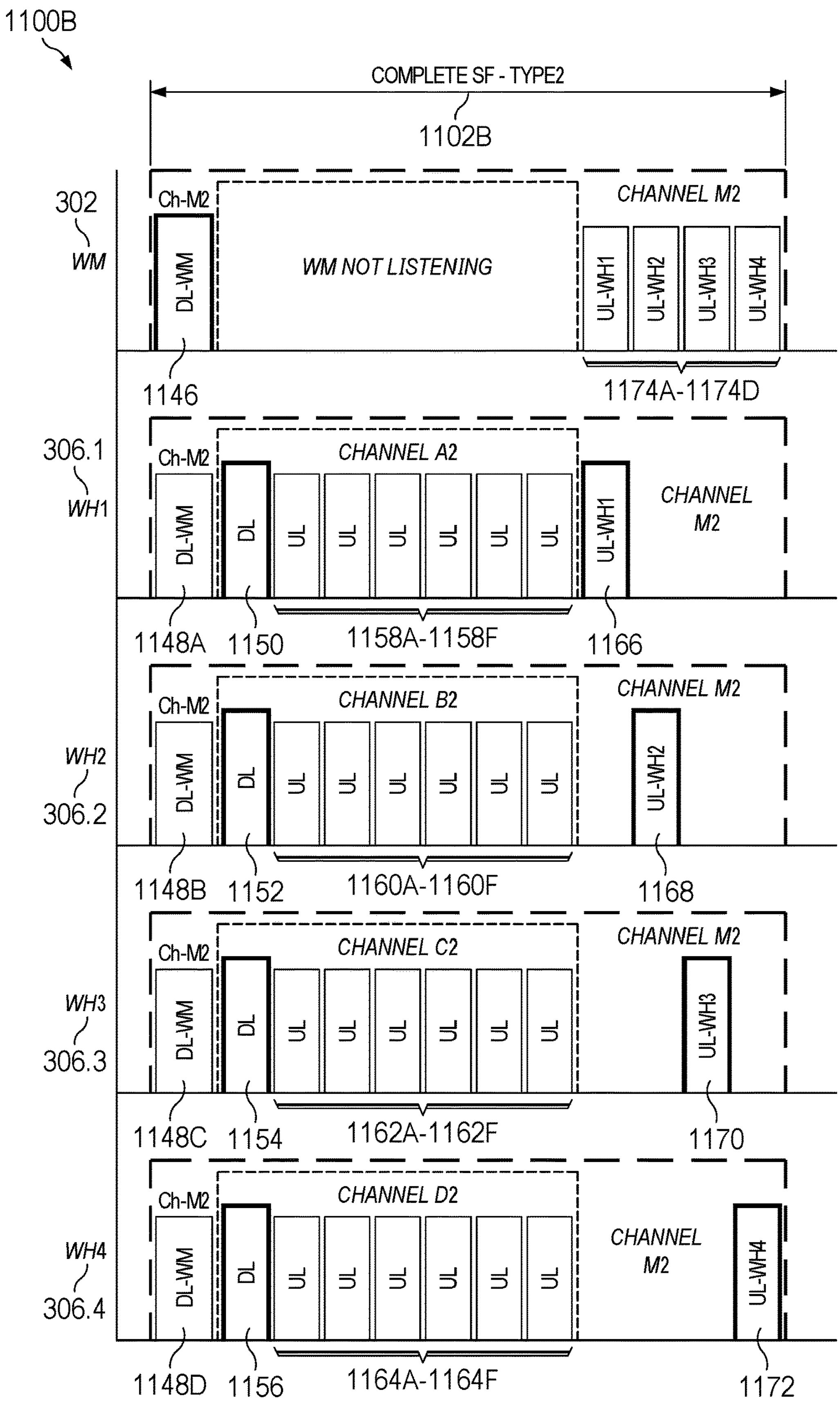
FIG. 11B is a super frame structure for network formation in accordance with various examples.

FIGS. 11A and 11B show super frame structures 1100A and 1100B, respectively, for network formation in accordance with various examples herein. FIGS. 11A and 11B are an extended example of network formation Option 3, where Type 3 super frames are used for network formation, and then the network switches to Type 2 super frames for data exchange.

Super frame structure 1100A in FIG. 11A includes super frame 1102A, and super frame structure 1100B in FIG. 11B includes super frame 1102B. Super frame 1102A is a Type 3 super frame for network formation. After super frame 1102A, the network is formed and WM 302 switches the network to super frame Type 2 for super frame 1102B. In this example, no WDs 308 are shown, but the WHs 306 communicate with the WDs 308 in their respective sub-clusters 304 as described above with Options 1 and 2.

In super frame structure 1100A, super frame 1102A operates similarly to super frame 1002A discussed above with respect to FIG. 10A. The process begins in super frame 1102A with WM 302 sending DL 1104 to each WH 306 in the cluster.

WH1 306.1 receives DL 1106A, WH2 306.2 receives DL 1106B, WH3 306.3 receives DL 1106C, and WH4 306.4 receives DL 1106D. DL 1104 from WM 302 contains an indication that WH1 306.1, WH2 306.2, WH3 306.3, and WH4 306.4 are in the scanning or network formation phase. WM 302 assigns the selected configuration channels and data channels to WH1 306.1, WH2 306.2, WH3 306.3, and WH4 306.4.

Each WH 306 in the network formation phase transmits a scan request DL to each WD 308 in its respective sub-cluster 304 on its respective configuration channel. WH1 306.1 sends DL 1108 on configuration channel 1, WH2 306.2 sends DL 1110 on configuration channel 2, and WH3 306.3 sends DL 1112 on configuration channel 3. WH4 306.4 waits in a waiting period 1114 for a configuration channel to become available. After DLs 1108, 1110, and 1112 are sent, the configuration channels are open, and WM 302 assigns configuration channel 1 to WH4 306.4. WH4 306.4 then sends DL 1116 to its WDs 308 in its sub-cluster 304. During the time that DL 1116 is transmitted, the other WHs 306 wait for DL 1116 to conclude. These waiting periods are shown as 1118A, 1118B, and 1118C for the first three WHs 306.

After the scan request DLs are sent to WDs 308, the WDs 308 respond to their respective WH 306 in the mini super frame. For this response, data channels are used rather than configuration channels. WH1 306.1 uses channel A1, WH2 306.2 uses channel B1, WH3 306.3 uses channel C1, and WH4 306.4 uses channel D1. WH1 306.1 receives ULs 1120 and 1122, WH2 306.2 receives ULs 1124 and 1126, WH3 306.3 receives ULs 1128 and 1130, and WH4 306.4 receives ULs 1132 and 1134.

After the ULs have been received by the WHs 306 from the WDs 308, each WH 306 aggregates the responses from its WDs 308 and sends a UL to WM 302 on channel M1. WH1 306.1 sends UL 1136, WH2 306.2 sends UL 1138, WH3 306.3 sends UL 1140, and WH4 306.4 sends UL 1142. WM 302 receives ULs 1144A-1144D, and super frame 1002A concludes.

In this example, network formation is complete after super frame 1102A. The WHs 306 indicate to WM 302 that they have completed network formation with ULs 1136, 1138, 1140, and 1142. Therefore, after receiving ULs 1144A-1144D, WM 302 switches to super frame Type 2 for super frame 1102B. Super frame 1102B operates similarly to Type 2 structures described above, such as super frame structure 400A in FIG. 4A.

In super frame 1102B in FIG. 11B, WM 302 sends requests or instructions to WHs 306, and then the WHs 306 communicate with their respective WDs 308 to collect the information and send it back to WM 302. In this example, WM 302 sends DL 1146 to each WH 306 on channel M2. WH 306.1 receives DL 1148A, WH 306.2 receives DL 1148B, WH 306.3 receives DL 1148C, and WH 306.4 receives DL 1148D. Then, each WH 306 communicates with its WDs 308 (not shown in FIG. 11B) by sending a DL on the channel assigned to the sub-cluster 304 by WM 302. WH 306.1 sends DL 1150 on channel A2, WH 306.2 sends DL 1152 on channel B2, WH 306.3 sends DL 1154 on channel C2, and WH 306.4 sends DL 1156 on channel D2.

The WDs 308 respond to WHs 306 with ULs as shown here. WH1 306.1 receives ULs 1158A-1158F from its WDs 308 on channel A2, WH2 306.2 receives ULs 1160A-1160F from its WDs 308 on channel B2, WH3 306.3 receives ULs 1162A-1162F from its WDs 308 on channel C2, and WH4 306.4 receives ULs 1164A-1164F from its WDs 308 on channel D2.

Each WH 306 aggregates the responses from the WDs 308 and transmits an UL to WM 302 on channel M2. WH1 306.1 sends UL 1166, WH2 306.2 sends UL 1168, WH3 306.3 sends UL 1170, and WH4 306.4 sends UL 1172. WM 302 receives ULs 1174A-1174D, and super frame 1102B is concluded. Therefore, FIGS. 11A and 11B show how a super frame Type 3 structure may be used for network formation and a super frame Type 2 structure may be used for data exchange in a WBMS.

Figure 12A:
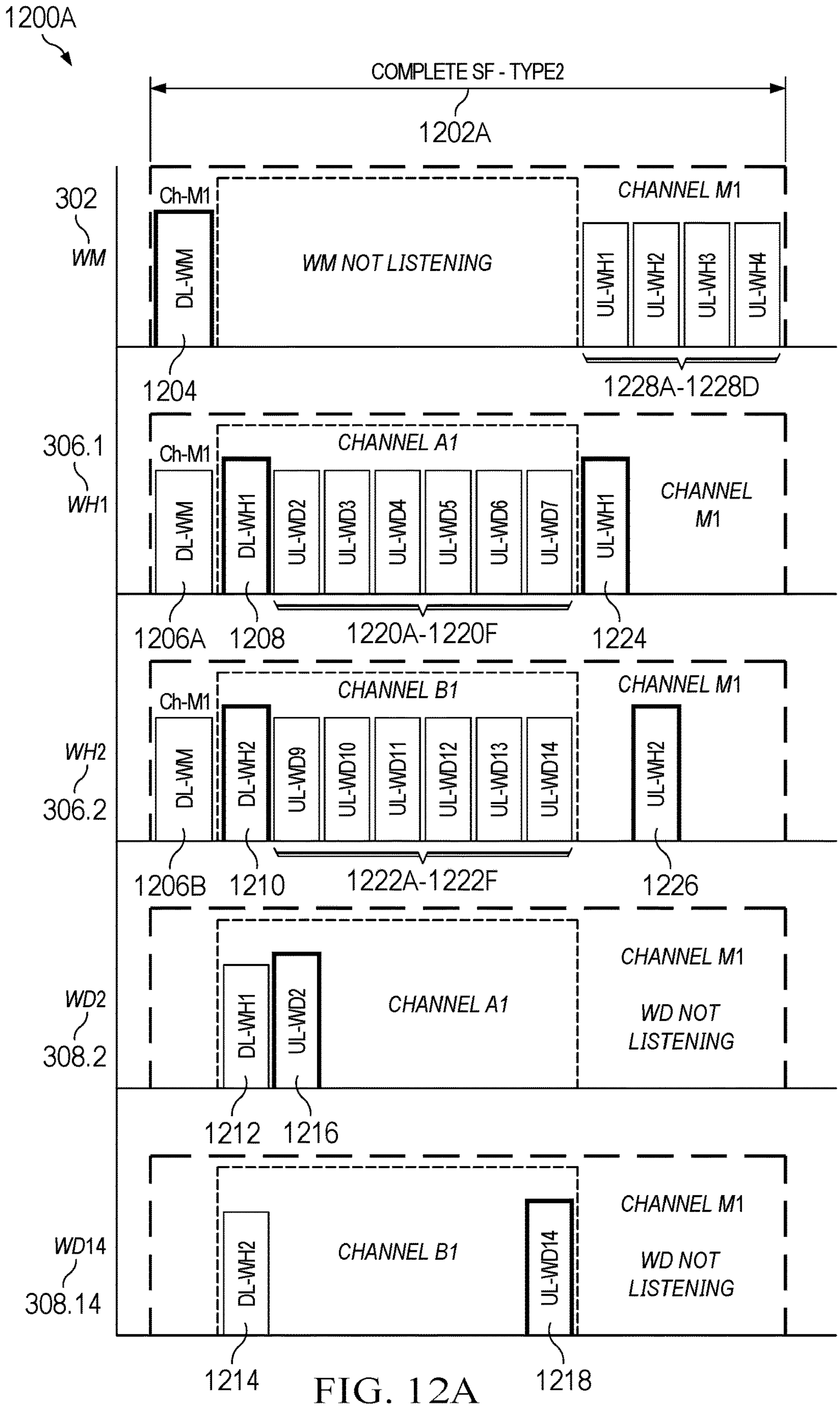
FIG. 12A is a keep alive operation in accordance with various examples.
Figure 12B:
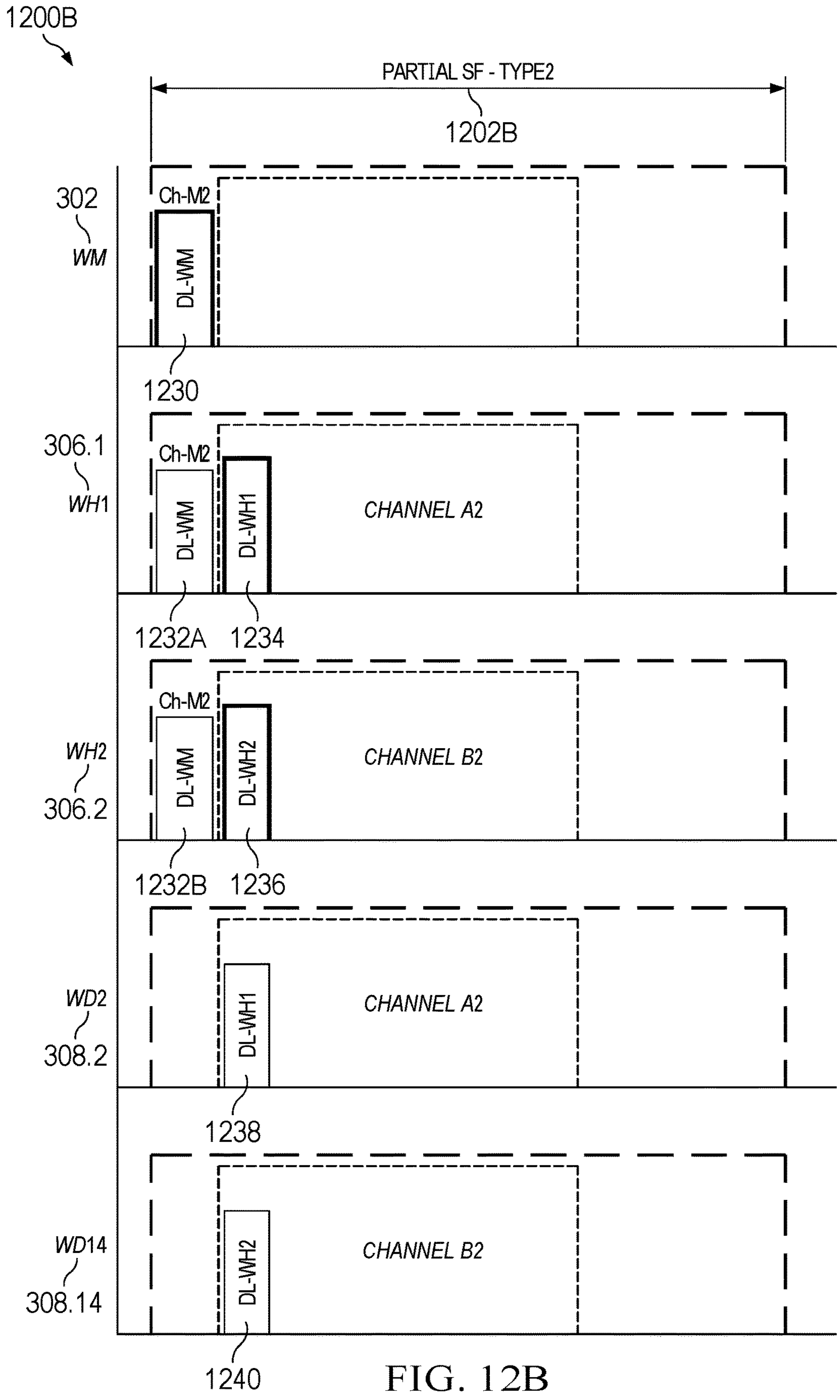
FIG. 12B is a keep alive operation in accordance with various examples.

FIGS. 12A and 12B show a keep alive operation in accordance with various examples herein. FIG. 12A shows a super frame structure 1200A that includes a complete Type 2 super frame 1202A. FIG. 12B shows a super frame structure 1200B that includes a partial Type 2 super frame 1202B. Here, WM 302 functions as a master node throughout the process. As described above, only WM 302 is in range of all WHs 306 in some examples, and therefore delegation of a master role is not possible. Based on latency requirements in the WBMS, complete, partial and idle super frames may be scheduled. The average power consumption for WM 302 may be reduced as it is listens for a shorter duration as compared to a single tier network. The average power consumption at a WH 306 may be higher than the average power consumption at a WD 308.

In super frame 1202A in FIG. 12A, a standard data exchange is shown between WH1 306.1. WH2 306.2 and their respective sub-clusters, as described above with respect to FIG. 4A. WM 302 sends a DL 1204 (DL-WM) on channel M1 to each of the WHs 306. In this case, WH1 306.1 receives the DL 1206A, and WH2 306.2 receives the DL 1206B. After WM 302 sends this DL 1204, WM waits for the WHs 306 to receive responses from the WDs 308 and then provide those responses to WM 302.

Responsive to DL 1204, each WH 306 sends a DL to the WDs 308 in its respective sub-cluster 304. In this example, WH1 306.1 transmits a DL 1208 (DL WH1) to WD2 through WD7 308. DL 1208 is transmitted on channel A1. WH1 306.1 uses channel A1 to communicate with its WDs 308 in first super frame 1202A. WH2 306.2 transmits a DL 1210 (DL WH2) to WD9 through WD14 308. DL 1210 is transmitted on channel B1. WH2 306.2 uses channel B1 to communicate with its WDs 308 in first super frame 1202A. In this example, each sub-cluster 304 uses a different channel for communications between the WH 306 and the WDs 308 in the sub-cluster 304.

Each WD 308 receives the DL (1208 or 1210 in this example) from its respective WH 306. Only WD2 308.2 and WD14 308.14 are shown in FIG. 12A, but other WDs 308 operate similarly. WD2 308.2 receives DL 1212, and WD14 308.14 receives DL 1214. Each WD 308 responds to its respective WH 306 with an UL. Here, WD2 308.2 sends UL 1216 to WH1 306.1 on channel A1. WD14 308.14 sends UL 1218 to WH2 306.2 on channel B1. Although not shown in FIG. 12A, other WDs 308 also send an UL to their respective WH 306 on the appropriate channels.

After receiving ULs from each WD 308 in its sub-cluster, each WH 306 aggregates the information in the ULs from the WDs 308 in its sub-cluster and sends an UL to WM 302. Here, WH1 306.1 sends UL 1224 to WM 302 on channel M1. WH2 306.2 sends UL 1226 to WM 302 on channel M1. ULs 1224 and 1226 are sent at different times on channel M1 as shown, so they do not interfere with one another. WM 302 receives ULs 1228A-1228D from each WH 306 that it manages. At this time, first super frame 1202A is complete and second super frame 1202B begins.

Super frame 1202B in FIG. 12B is a partial Type 2 super frame used for a keep alive operation. WM 302 sends a DL 1230 to the WHs 306 with keep alive instructions on channel M2. WH1 306.1 receives DL 1232A, and WH2 306.2 receives DL 1232B. Then, WHs 306 send a DL to their respective WDs 308 in their respective data channels. WH1 306.1 sends a DL 1234 to its WDs 308 (including WD2 308.2), and WH2 306.2 sends a DL 1236 to its WDs 308 (including WD14 308.14). WH1 306.1 communicates with its sub-cluster on channel A2, and WH2 306.2 communicates with its sub-cluster on channel B2. WD2 308.2 receives DL 1238 from WH1 306.1, and WD14 308.14 receives DL 1240 from WH2 306.2. In this super frame 1202B, WDs 308 do not send a response back to WHs 306, and WHs 306 do not send a response back to WM 302. The DLs maintain synchronization between the components while conserving power. ULs are not used in super frame 1202B.

Examples herein may include procedures for a node rejoin process. If a specific WD 308 in a sub-cluster 304 stops communicating while in normal operation, after a timeout, the WH 306 can instruct the WDs 308 in the sub-cluster 304 to scan the configuration channels. The WH 306 informs WM 302 that the WH 306 is entering a pairing phase. The other WHs may continue normal operation. After all WDs 308 in the sub-cluster 304 respond to the WH 306, WH 306 informs WM 302 and WM 302 initiates the master hopping sequence for the WH 306. In a single-tier network, all nodes would be asked to scan configuration channels even if only one WD 308 lost the connection. Here, the other sub-clusters 304 may continue operation while another sub-cluster 304 performs a rejoin operation.

If a WH 306 stops communicating with a WM 302, the WM 302 may re-initiate the pairing process for all WHs 306. The WDs 308 would be asked to scan configuration channel to begin the re-initiation.

Figure 13:
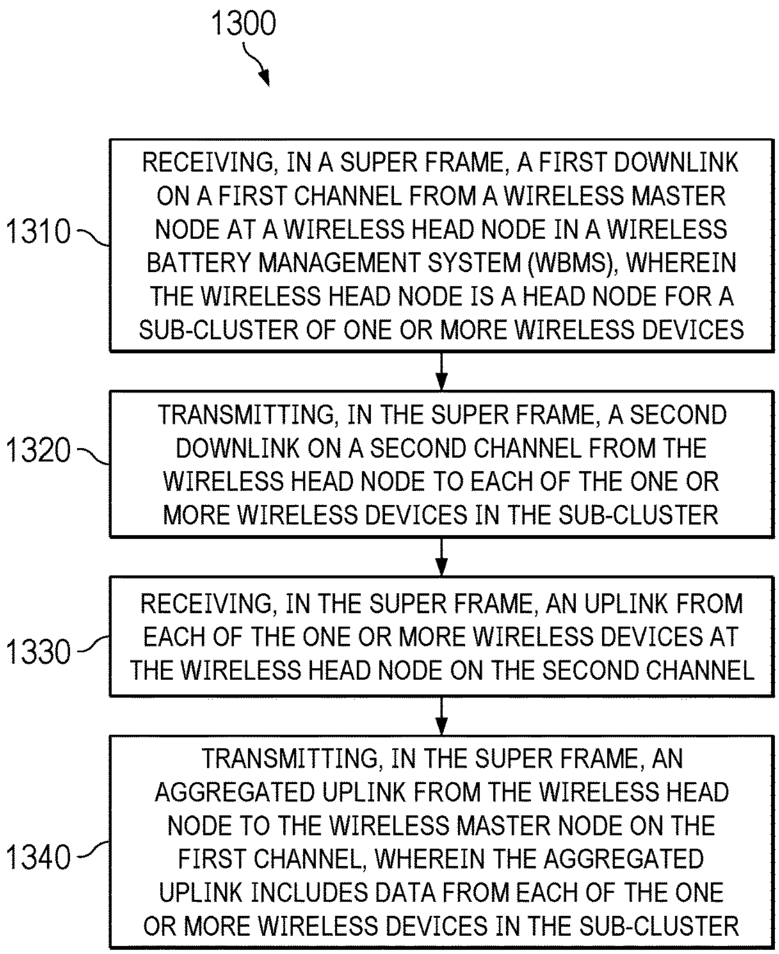
FIG. 13 is a flow diagram of a method for hierarchical network operation for a WBMS in accordance with various examples.

FIG. 13 is a flow diagram of a method 1300 for hierarchical network operation for a WBMS in accordance with various examples herein. The steps of method 1300 may be performed in any suitable order. The hardware components described above with respect to FIGS. 1-3 may perform method 1300 in some examples. Any suitable hardware, software, or digital logic may perform method 1300 in some examples.

Method 1300 begins at 1310, where a wireless head node (WH 306) receives, in a super frame, a first downlink on a first channel from a wireless master node (WM 302) in a WBMS, where the wireless head node is a head node for a sub-cluster 304 of one or more wireless devices 308. One examples of a first downlink is DL 406A in super frame 402A in FIG. 4A.

Method 1300 continues at 1320, where the wireless head node (WH 306) transmits, in the super frame, a second downlink on a second channel to each of the one or more wireless devices 308 in the sub-cluster 304. The second downlink may be DL 408 in FIG. 4A.

Method 1300 continues at 1330, where the wireless head node (WH 306) receives, in the super frame, an uplink from each of the one or more wireless devices 308 on the second channel. In one example, the uplinks from the wireless devices 308 are ULs 420A-420F in FIG. 4A.

Method 1300 continues at 1340, where the wireless head node (WH 306) transmits, in the super frame, an aggregated uplink from the wireless head node (WH 306) to the wireless master node (WM 302) on the first channel, where the aggregated uplink includes data from each of the one or more wireless devices in the sub-cluster. In one example, the aggregated uplink is UL 424 in FIG. 4A.

In examples herein, a hierarchical WBMS network structure is described that can handle a large number of nodes with low latency and one-hop extension. A primary node (WM 302) operates as a master node for an entire network of nodes. The secondary nodes are divided into sub-clusters 304, with one or more secondary nodes in each sub-cluster 304. A secondary node in each sub-cluster operates as a wireless head (WH 306) node, and acts as a master node for the sub-cluster 304 to which it belongs. The other secondary nodes in each sub-cluster 304 are WDs 308. In some examples, a dedicated WH 306 node may be used in the sub-cluster 304 rather than selecting one of the WDs 308 as the WH 306. The WM 302 and the WHs 306 can use a master hopping sequence to manage the communications channels used by the nodes.

In the hierarchical system described herein, WM 302 communicates with the WHs 306, and the WHs 306 communicate with the WDs 308. WM 302 is in communication range with the WHs 306, and the WHs 306 are in communication range with their respective WDs 308 in their sub-cluster 304. The sub-clusters 304 may have the same number of WDs 308 or a different number of WDs 308. A number of super frame structures are described herein for managing communications between nodes arranged in the hierarchical system.

For a WBMS with a large number of nodes, latency is reduced with the hierarchical system and super frame structures described herein. Throughput is also increased due to the efficient super frame structures. Low network restart times may be achieved, and power consumption may also be reduced in the examples herein.

In this description, the term “couple” may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is “configured to” perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

In this description, unless otherwise stated, “about,” “approximately” or “substantially” preceding a parameter means being within +/−10 percent of that parameter. Modifications are possible in the described examples, and other examples are possible within the scope of the claims.

The invention claimed is:

1. A method, comprising:

receiving, in a super frame, a first downlink on a first channel from a wireless master node at a wireless head node in a wireless battery management system (WBMS), wherein the wireless head node is a head node for a sub-cluster of one or more wireless devices;

wirelessly transmitting, in the super frame, a second downlink on a second channel from the wireless head node to each of the one or more wireless devices in the sub-cluster;

wirelessly receiving, in the super frame, an uplink from each of the one or more wireless devices at the wireless head node on the second channel; and transmitting, in the super frame, an aggregated uplink from the wireless head node to the wireless master node on the first channel, wherein the aggregated uplink includes data from each of the one or more wireless devices in the sub-cluster.

2. The method of claim 1, wherein the super frame is a first super frame, and the method further comprises:

receiving, in a second super frame, a third downlink on a third channel from the wireless master node at the wireless head node;

transmitting, in the second super frame, a fourth downlink on a fourth channel from the wireless head node to each of the one or more wireless devices in the sub-cluster;

receiving, in the second super frame, an uplink from each of the one or more wireless devices at the wireless head node on the fourth channel; and transmitting, in the second super frame, a second aggregated uplink from the wireless head node to the wireless master node on the third channel, wherein the second aggregated uplink includes data from each of the one or more wireless devices in the sub-cluster.

3. The method of claim 1, wherein the second channel is a configuration channel.

4. The method of claim 1, wherein the wireless head node is a first wireless head node, the sub-cluster is a first sub-cluster, and the method further comprises:

receiving, in the super frame, the first downlink on the first channel from the wireless master node at a second wireless head node, wherein the second wireless head node is a head node for a second sub-cluster; and transmitting, in the super frame, a third downlink on a third channel from the second wireless head node to each of the one or more wireless devices in the second sub-cluster.

5. The method of claim 1, wherein the wireless head node is a first wireless head node, the sub-cluster is a first sub-cluster, the aggregated uplink is a first aggregated uplink, and the method further comprises:

transmitting, in the super frame, a second aggregated uplink from a second wireless head node to the wireless master node on the first channel, wherein the second aggregated uplink includes data from each of one or more wireless devices in a second sub-cluster.

6. The method of claim 1, wherein the first channel and the second channel are non-adjacent channels selected with a master hopping sequence.

7. A system, comprising:

a wireless head node in a wireless battery management system (WBMS), wherein the wireless head node is a head node for a sub-cluster of one or more wireless devices, and the wireless head node is configured to:

receive, in a super frame, a first downlink on a first channel from a wireless master node;

wirelessly transmit, in the super frame, a second downlink on a second channel to each of the one or more wireless devices in the sub-cluster;

wirelessly receive, in the super frame, an uplink from each of the one or more wireless devices on the second channel; and transmit, in the super frame, an aggregated uplink to the wireless master node on the first channel, wherein the aggregated uplink includes data from each of the one or more wireless devices in the sub-cluster.

8. The system of claim 7, wherein the super frame is a first super frame, and the wireless head node is further configured to:

receive, in a second super frame, a keep alive downlink on a third channel from the wireless master node.

9. The system of claim 8, wherein the keep alive downlink is a first keep alive downlink, and the wireless head node is further configured to:

transmit, in the second super frame, a second keep alive downlink to each of the one or more wireless devices in the sub-cluster.

10. The system of claim 7, wherein the aggregated uplink includes data from the wireless head node.

11. The system of claim 7, wherein each of the one or more wireless devices is coupled to at least one battery cell.

12. The system of claim 7, wherein the first downlink includes a request for battery cell information from the one or more wireless devices.

13. The system of claim 12, wherein the wireless head node is configured to delay a measurement for battery cell information for a battery cell coupled to the wireless head node.

14. The system of claim 7, wherein the first downlink and the second downlink are requests for network formation.

15. The system of claim 14, wherein the wireless head node is a first wireless head node, and the first wireless head node is configured to complete network formation for the sub-cluster before a second wireless head node begins network formation.

16. A system, comprising:

a first wireless head node in a wireless battery management system (WBMS), wherein the first wireless head node is a head node for a sub-cluster of one or more wireless devices, and the first wireless head node is configured to:

receive, in a super frame, a first downlink on a first channel from a wireless master node;

transmit, in the super frame, a second downlink on a configuration channel to each of the one or more wireless devices in the sub-cluster;

wait for a second wireless head node to transmit a third downlink on the configuration channel;

receive, in the super frame, an uplink from each of the one or more wireless devices on a second channel; and transmit, in the super frame, an aggregated uplink to the wireless master node on the first channel, wherein the aggregated uplink includes data from each of the one or more wireless devices in the sub-cluster.

17. The system of claim 16, further comprising:

the second wireless head node in the WBMS, wherein the second wireless head node is a head node for a second sub-cluster of one or more wireless devices, and the second wireless head node is configured to:

receive, in the super frame, the first downlink on the first channel from the wireless master node;

wait for the first wireless head node to transmit the second downlink on the configuration channel;

transmit, in the super frame, the third downlink on the configuration channel to each of one or more wireless devices in the second sub-cluster;

receive, in the super frame, an uplink from each of the one or more wireless devices in the second sub-cluster on a third channel; and transmit, in the super frame, a second aggregated uplink to the wireless master node on the first channel, wherein the second aggregated uplink includes data from each of the one or more wireless devices in the second sub-cluster.

18. The system of claim 16, wherein the second downlink is a request for network formation for the one or more wireless devices in the sub-cluster.

19. The system of claim 16, wherein each of the one or more wireless devices is coupled to a battery cell.

20. The system of claim 16, wherein the super frame is a first super frame, the configuration channel is a first configuration channel, and the first wireless head node is further configured to:

receive, in a second super frame, a fourth downlink on a third channel from the wireless master node; and transmit, in the second super frame, a fifth downlink on a second configuration channel to each of the one or more wireless devices in the sub-cluster.

* * * * *